(12) United States Patent
Nagasaku et al.

(10) Patent No.: US 7,310,061 B2
(45) Date of Patent: Dec. 18, 2007

(54) VELOCITY SENSOR AND GROUND VEHICLE VELOCITY SENSOR USING THE SAME

(75) Inventors: Toshiyuki Nagasaku, Kokubunji (JP); Hiroshi Kondoh, Fuchu (JP); Hiroshi Shinoda, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/207,004

(22) Filed: Aug. 19, 2005

(65) Prior Publication Data

US 2006/0139206 A1    Jun. 29, 2006

(30) Foreign Application Priority Data

Dec. 28, 2004  (JP)  ............... 2004-378770

(51) Int. Cl.
*G01P 3/42* (2006.01)
*G01P 3/00* (2006.01)
*G01S 13/58* (2006.01)
*G01S 13/00* (2006.01)

(52) U.S. Cl. .............. 342/104; 342/70; 342/115; 342/175; 342/195

(58) Field of Classification Search ........ 180/167–169; 342/104–117, 175, 195, 70–72; 367/87, 367/89–91
See application file for complete search history.

(56) References Cited

U.S. PATENT DOCUMENTS

| 1,864,638 | A | * | 6/1932 | Chilowsky ............ 367/91 |
| 2,834,014 | A | * | 5/1958 | Thorne ............... 342/117 |
| 3,833,906 | A | | 9/1974 | Augustine |
| 4,517,566 | A | | 5/1985 | Bryant et al. |
| 4,788,553 | A | | 11/1988 | Phillips |
| 5,481,268 | A | * | 1/1996 | Higgins ............... 342/70 |
| 6,230,107 | B1 | | 5/2001 | Yamamoto et al. |
| 6,717,544 | B2 | | 4/2004 | Nagasaku et al. |

FOREIGN PATENT DOCUMENTS

| DE | P2635952.4-35 | 2/1978 |
| DE | P2951021.2 | 7/1981 |
| GB | 2258965 A | 2/1993 |
| JP | 07-260931 | 10/1995 |
| JP | 07-260931 A | 2/1996 |
| JP | 09-264952 | 10/1997 |
| JP | 09-264952 A | 1/1998 |
| JP | 2003-315438 | 11/2003 |

* cited by examiner

*Primary Examiner*—Bernarr E. Gregory
(74) *Attorney, Agent, or Firm*—Mattingly, Stanger, Malur & Brundidge, PC

(57) ABSTRACT

There is provided a highly accurate velocity sensor having a reduced detection error. A sensor circuit unit generates an electromagnetic wave and emits it from a transmission antenna. Furthermore, a reception antenna receives a reflection wave from the ground and a mixer mixes it with a local signal, thereby generating a low-frequency signal. The electromagnetic wave emitted from the sensor circuit unit shapes a beam by a dielectric lens before emitting it toward the ground. Here, the beam shape is such that the beam width in the vicinity of the sensor is smaller than the beam width in the vicinity of the ground.

28 Claims, 15 Drawing Sheets

VELOCITY SENSOR AND GROUND VEHICLE VELOCITY SENSOR USING THE SAME

BACKGROUND OF THE INVENTION

The present invention relates to a velocity sensor for detecting a relative velocity with an object by emitting an electromagnetic wave and receiving a reflection signal of the electromagnetic wave reflected by the object and in particular, to a ground vehicle velocity sensor for detecting a velocity with respect to the ground by receiving a reflection wave from the ground.

Conventionally, there is known a velocity sensor using the Doppler sensor for detecting relative velocity with respect to an object. The sensor emits an electromagnetic wave or a supersonic wave to the object and receives the reflected wave, thereby utilizing the Doppler effect generated by the relative velocity with respect to the object. For example, there is a vehicle velocity sensor for correcting the ground vehicle velocity value obtained by the Doppler sensor according to the angular velocity around the center of gravity of the vehicle (for example, JP-A-9-264952).

Moreover, conventionally, there is known an on-vehicle supersonic wave measurement device for accurately detecting a vehicle speed by transmitting a supersonic wave signal from a supersonic wave transmitter to the road surface, receiving the reflected wave by a supersonic wave receiver, amplifying the received signal, and obtaining a reflected wave frequency from the amplified signal, wherein the supersonic wave transmitted from the supersonic wave transmitter to the road surface is focused on the road surface (for example, JP-A-7-260931).

Moreover, conventionally, there is a radar sensor including an active circuit such as an oscillator and a mixer and an antenna integrally formed on the same semiconductor substrate and configured on a single or a plurality of MMIC (Monolithic Microwave Integrated Circuit) chip, wherein the MMIC chip is sealed by a resin package, a dielectric lens is mounted on the upper portion of the antenna, and the lens and the resin package are integrally formed by a mold, thereby reducing the cost (For example, JP-A-2003-315438).

SUMMARY OF THE INVENTION

The inventors of the present invention have studied the velocity sensor and the technique for applying it to a ground vehicle velocity sensor and extracted the aforementioned documents of the conventional technique before arriving at the invention. As a result, the inventors of the present invention have found that the techniques disclosed in JP-A-9-264952 and JP-A-7-260931 have following problems. Hereinafter, the problems will be detailed.

Especially recently, velocity sensors using microwave or millimeterwave among electromagnetic waves are often used. Among the velocity sensors, there is one which measures a relative velocity with respect to the ground, i.e., measures the ground velocity. For example, as shown in FIG. 2, the velocity sensor applies an electromagnetic wave to the ground with a certain angle θ and receives a reflected wave from the ground to detect the velocity with respect to the ground. Here, the frequency of the reflected wave is shifted by frequency fd shown in the Expression 1 as follows with respect to the frequency of the emitted signal by the Doppler effect.

$$f_d = \frac{2v\cos\theta}{c} f_0 \qquad \text{[Expression 1]}$$

In the Expression above, f0 denotes a frequency of a signal emitted, v denotes a velocity with respect to the ground, and c denotes the light velocity. Accordingly, by subjecting the reception signal to a signal processing such as FFT (Fast Fourier Transform), fd can be calculated from the frequency component of the reception signal and further by using the Expression 1, the velocity v with respect to the ground can be calculated from fd.

As an example utilizing such a Doppler sensor, there is known a vehicle velocity detection device which corrects the ground vehicle velocity obtained by the Doppler sensor disclosed in JP-A-9-264952 according to the angular velocity around the center of gravity of the vehicle. However, the device has following problems.

The electromagnetic wave actually irradiated has a certain spread as shown in FIG. 2. If it is assumed that the angle defined by the electromagnetic wave and the ground is θ1 at maximum and θ2 at minimum because of the spread, the frequency shift amount of the reflected wave by the Doppler effect also have irregularities accompanying the change (irregularities) of θ within the range of θ2≦θ≦θ1 in the Expression 1. Because of the irregularities, the output frequency detected finally has an ambiguity within the range of this spread. That is, the ground velocity calculated according to this also has an ambiguity and accordingly, this is outputted as a detection error.

The aforementioned document JP-A-7-260931 discloses configuration for focusing a supersonic wave transmitted onto the ground on the ground surface so as to form a supersonic wave beam spot, thereby preventing a vehicle velocity detection error caused by water droplets when a vehicle runs on the ground covered by water. In this configuration, a supersonic wave signal transmitted has a shape to form a spot almost in the perpendicular direction on the road surface and the supersonic wave signal reflected by the road surface is received. Here, if the spot on the road surface is assumed to be a second supersonic wave irradiation source, the velocity is detected by receiving the side lobe of the supersonic wave signal from the irradiation source. However, in this configuration, since the signal from the side lobe is used, there is a problem that it is impossible to use the signal of the center direction component having the largest energy and the sensitivity of the sensor is small. Moreover, as is disclosed in FIG. 2 of JP-A-7-260931, when the angle defined by the direction toward the supersonic wave receivers R1, R2 from the spot and the vehicle running direction is θ, the velocity actually measured is calculated as v×cos θ for the vehicle running velocity v with respect to the ground. Accordingly, in order to improve the speed resolution, it is necessary to reduce the θ. However, in the configuration disclosed in JP-A-7-260931, a signal from the side lobe is received to detected the velocity and the θ is limited to an angle where the side lobe is generated. Here, the angle where the side lobe is generated is almost constant and accordingly, the θ is also almost constant and cannot be varied. For example, when using a first side lobe level having a comparatively large signal level, as is disclosed in FIG. 2 of JP-A-7-260931, the angle where the first side lobe is generated is determined to θ. For this, there is a problem that it is impossible to sufficiently improve the velocity resolution. In addition to this, when applying the measurement device configuration of JP-A-7-260931 to various vehicles having different heights, there is a problem that since the angle where the first side lobe is generated is determined to be θ, according to change of the vehicle height, i.e., the distance between the supersonic wave beam spot SP and the supersonic wave transmitter UT, it is necessary to change the distance L from the center axis passing through the UT to the supersonic wave receivers R1, R2. That is, according to the change of the vehicle height, it is necessary to modify the size of the measurement device itself.

A velocity sensor according to the present invention and a ground vehicle velocity sensor using it can be briefly described as follows.

Firstly, a velocity sensor according to the present invention is configured so as to be installed on an movable body for emitting a transmission signal having wave characteristics, receiving a reflection signal of the transmission signal reflected from an object, and generating and outputting a signal required for calculating a relative speed between the movable body and the object according to the reflection signal received and the transmission signal. Here, the transmission signal forms a beam shape, which is formed with a beam width in the vicinity of the object almost identical to or smaller than the beam width in the vicinity of an emission opening of the velocity sensor for emitting the transmission signal. Furthermore, the transmission signal is emitted from the emission opening in the direction defining a predetermined angle with the relative speed direction of the movable body with respect to the object, and the predetermined angle is an arbitrary angle greater than 0 degrees and smaller than 90 degrees or greater than 90 degrees and smaller than 180 degrees.

Moreover, a ground vehicle velocity sensor according to the present invention detects a ground travelling speed of a vehicle travelling on a ground and having a beam generation unit attached to it, according to frequency of a bean emitted from the beam generation unit toward the ground and frequency of a reflection beam generated from the beam reflected from the ground. For this, the ground vehicle velocity sensor is characterized by the following. Firstly, the beam has such a shape that the beam width in the vicinity of the ground is almost identical or smaller than the beam width in the vicinity of an emission opening of the beam generation unit for emitting the beam. Furthermore, the beam is emitted from the emission opening in the direction defining a predetermined angle with the relative speed direction of the vehicle with respect to the ground. Here, the predetermined angle is an arbitrary angle greater than 0 degrees and smaller than 90 degrees or greater than 90 degrees and smaller than 180 degrees.

According to the present invention, the electromagnetic wave irradiated is formed in a beam shape for use in velocity detection and accordingly, it is possible to reduce the velocity sensor detection error.

Other objects, features and advantages of the invention will become apparent from the following description of the embodiments of the invention taken in conjunction with the accompanying drawings.

DETAILED DESCRIPTION OF THE EMBODIMENTS

The velocity sensor and the ground vehicle velocity sensor using it are characterized in that an electromagnetic wave irradiated from the sensor is focused in order to suppress spread of the irradiated electromagnetic wave causing a velocity error and the velocity sensor is arranged in such a manner that the electromagnetic wave irradiation direction of the sensor is at a predetermined angle with the vehicle velocity direction in order to realize an optimal speed resolution in a predetermined sensor sensitivity.

In general, the electromagnetic wave emitted from the sensor has a greater spread as it goes farther from the sensor. However, according to the present invention, a beam is formed in such a manner that the spread, i.e., the beam width of the electromagnetic wave in the vicinity of the sensor is almost identical or smaller than the spread, i.e., the beam width of the electromagnetic wave in the vicinity of the object to be measured. Thus, it is possible to suppress the area of the electric wave applied to the object, thereby enabling a highly-accurate velocity detection. It should be noted that the object is the ground in the case of the ground vehicle velocity sensor for measuring the relative velocity with respect to the ground.

Figure 1:
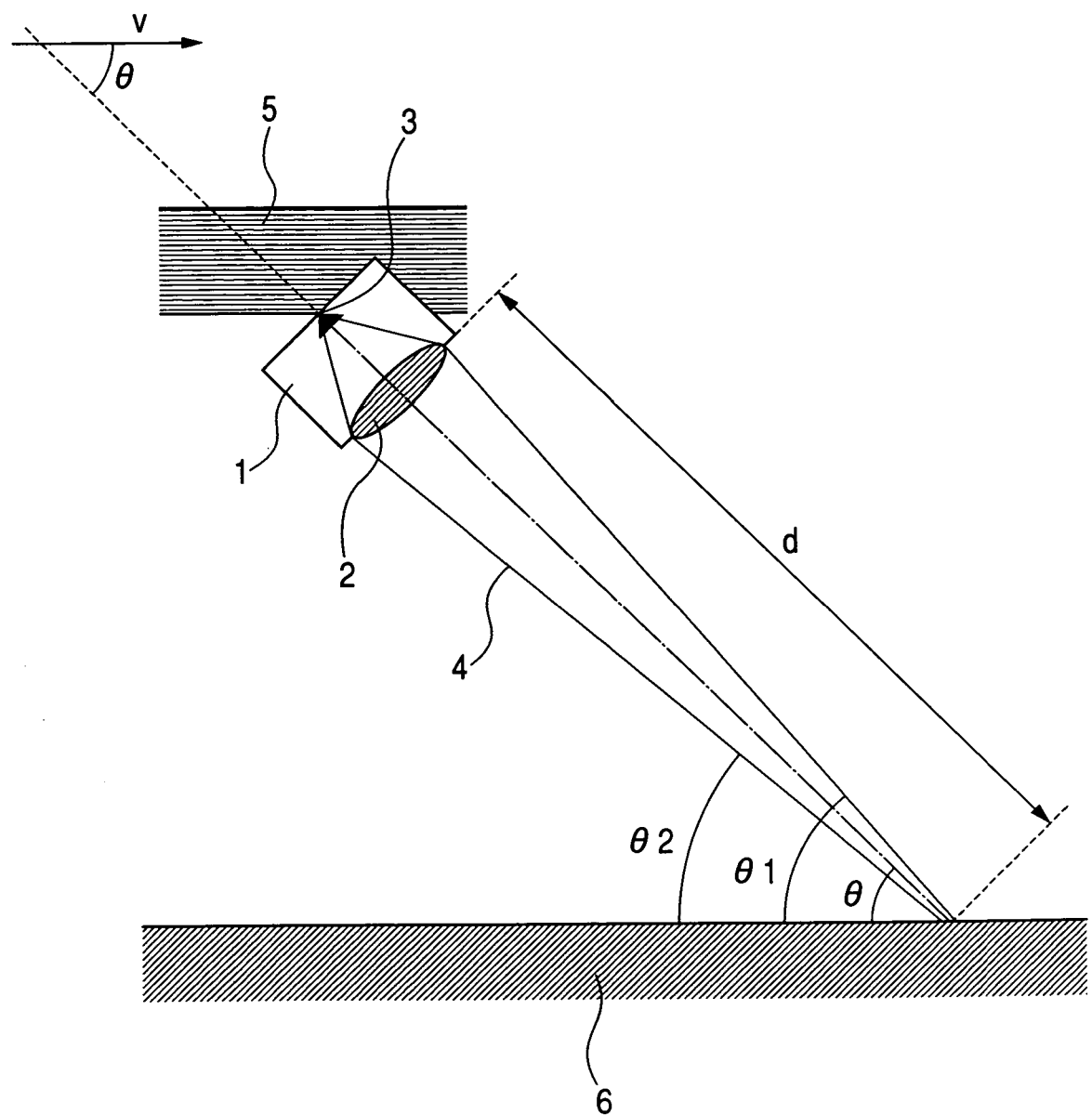
FIG. 1 explains a ground vehicle velocity sensor (embodiment 1).
Figure 2:
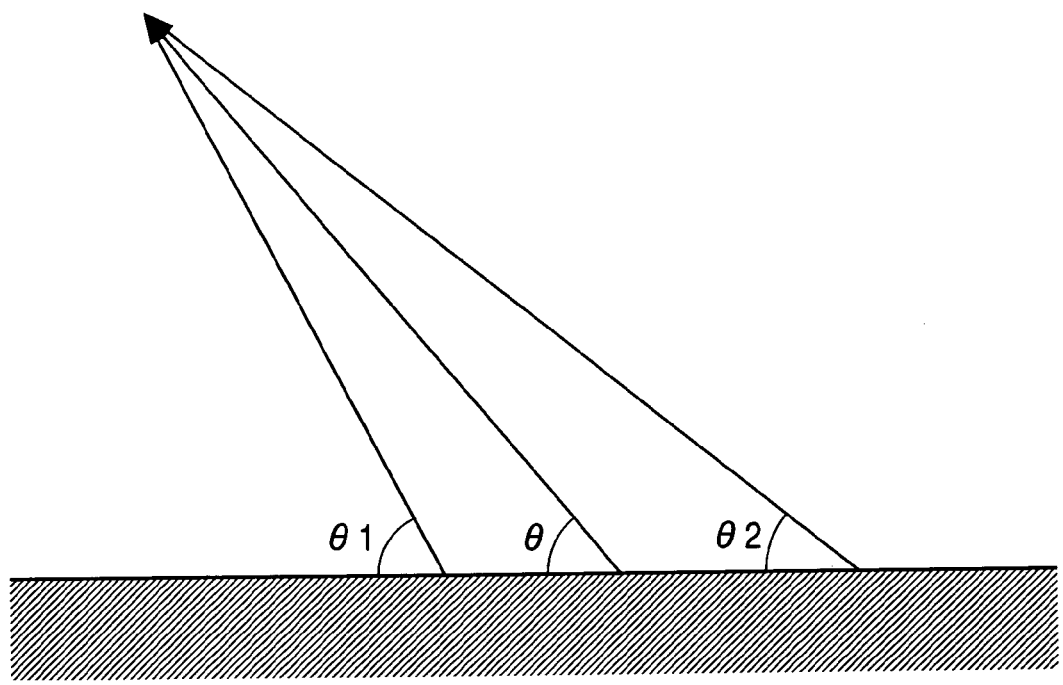
FIG. 2 shows a beam shape emitted from an antenna.

When the beam width in the vicinity of the velocity sensor 1 is almost identical to the beam width in the vicinity of the object, it is clear that the angular irregularities shown in FIG. 2 are eliminated. Even when the beam width in the vicinity of object is smaller than the beam width in the vicinity of the velocity sensor 1, the angular irregularities shown in FIG. 2 may be eliminated because of the reason explained below. In FIG. 1, strictly speaking, the angle θ defined by the emitted electromagnetic wave (beam) and the object (ground 6) varies within the range of $\theta2 \leq \theta \leq \theta1$. However, if it is possible to configure the velocity sensor 1 in such a manner that the distance d from the center point of a second lens 2 serving as the irradiation source of a transmission signal (electromagnetic wave) of the velocity sensor 1 is sufficiently large as compared to the diameter of the second lens 2, the angles $\theta$, $\theta1$, $\theta2$ approximately satisfy the relationship $\theta \approx \theta1 \approx \theta2$. Accordingly, especially in the application where such a condition is satisfied, even when it is difficult to form the beam shape in such a manner that the beam width in the vicinity of the velocity sensor 1 is almost identical to the beam width in the vicinity of the object, it is possible to eliminate the problem of the angular irregularities shown in FIG. 2 if the velocity sensor 1 is configured so that the beam width in the vicinity of the object is smaller than the beam width in the vicinity of the angular sensor 1. For example, in the case of the ground vehicle velocity sensor, the distance d can be assured to be about the diameter of the second lens 2 multiplied by 10 and accordingly, the relationship $\theta \approx \theta1 \approx \theta2$ is approximately satisfied. Thus, it is possible to suppress irregularities of the angle $\theta$ and can perform highly-accurate velocity detection with a small detection error.

In general, an antenna is used as means for irradiating an electromagnetic wave. In order to form a beam irradiated from the antenna, it is necessary to use an antenna of a large diameter, an array of antennas, a parabolic antenna, or a combination of an antenna and a dielectric lens. Moreover, as an antenna shape, various types are used. To any of the shapes, the present invention can basically be applied. However, recently, in order to reduce the device size, an antenna of a planar shape such as a microstrip patch antenna is often used. In this invention also, it is preferable to use an antenna of a planar shape so as to reduce the device size.

When using a dielectric lens in combination with the planar antenna, an antenna having a small number of elements is often used. Especially when configuring the antenna on an MMIC (Monolithic Microwave Integrated Circuit), the area of the MMIC is proportional to the cost and the antenna cannot be made into an array type. Accordingly, it is necessary to use an antenna having a small number of elements. When using an antenna having a small number of elements, the electromagnetic wave irradiated from the antenna cannot perform a sufficient beam synthesis and accordingly, the spread angle (irradiation angle) of the irradiated electric wave becomes large. Consequently, the lens for covering the entire power range of the beam should have a very large diameter. For example, when the antenna has a small number of elements having an irradiation angle of 120 degrees and a dielectric lens is arranged at 5 cm from the antenna, a dielectric lens having a diameter not smaller than 17 cm is required in order to cover the entire power range. The diameter of the dielectric lens may be reduced by arranging the dielectric lens at a position near to the antenna, but there is a trade off that a higher machining accuracy of the dielectric lens is required.

Figure 3:
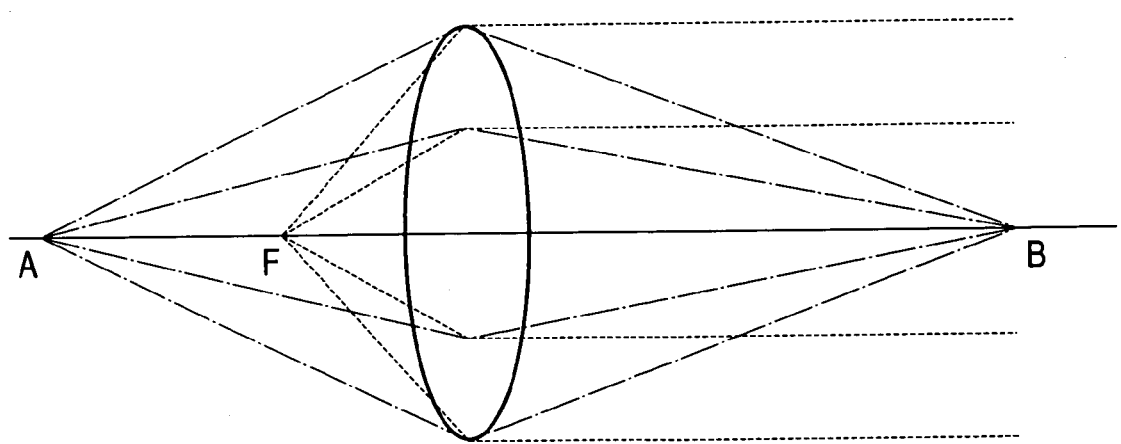
FIG. 3 shows the relationship between a lens and a focal point.

Optical primary approximation about the focal point F and image forming points A, B of the lens as shown in FIG. 3 is expressed in the following equation [Expression 2].

$$\frac{1}{F} = \frac{1}{A} + \frac{1}{B} \qquad \text{[Expression 2]}$$

In order to check the change of the image forming point B when F is changed due to a machining error of the dielectric lens, the aforementioned [Expression 2] is differentiated to obtain the following equation [Expression 3].

$$\frac{dB}{dF} = \frac{A^2}{(A-F)^2} \qquad \text{[Expression 3]}$$

In the ground vehicle velocity sensor, A corresponds to the position of an equivalent point light source irradiating an electromagnetic wave, B corresponds the position near to the object, i.e., the position of the image forming point near the ground, and F corresponds to the focal point determined by the shape of the lens. The Expression 3 means that as the position A of the point light source approaches the focal point F of the lens, the fluctuation of B with respect to the fluctuation of F becomes greater. Since F is a constant determined by the lens shape, strict machining accuracy of the lens is required in order to obtain F without irregularities. Moreover, in order to make the image forming point B not infinitely large, F<A should be satisfied. Accordingly, the distance between the point light source A and the lens is preferably large.

The present invention solves the aforementioned problem by using a plurality of lenses (especially dielectric lens in the case of electromagnetic wave). That is, a first lens is arranged in the vicinity of the antenna. The first lens reduces the beam irradiation angle but the image forming point is still at the infinitely far point. To cope with this, a second lens 2 is further arranged in such a manner that focusing is performed so that the image forming point B is at an arbitrary position. Here, since the beam irradiation angle is reduced by the first lens, the entire power range can be covered with a small lens diameter even if the second lens 2 is arranged at a far distance. Moreover, the first lens is used to reduce the irradiation angle of the beam from the antenna while the image forming point is determined by the second lens 2. Accordingly, the machining accuracy of the first lens does not affect greatly the image forming point.

As an example, when the beam irradiation angle can be narrowed to 30 degrees by the first lens and the second lens 2 is arranged at 5 cm from the position of an equivalent point light source, the lens diameter may be in the order of 4 cm.

It should be noted that explanation has been given on the case using two lenses but it is also possible to use three or more lenses to obtain at least the equivalent effect. Moreover, explanation has been given on the case using a low-element antenna having a small number of elements and a plurality of lenses to form the electromagnetic wave into a beam shape. However, at least the equivalent effect can be obtained when the equivalent beam shape is obtained by using an array antenna, a large-diameter antenna, a parabolic antenna, or one or more dielectric lenses or a combination of these.

In the case of the ground vehicle velocity sensor detecting a relative speed with respect to the ground, A corresponds to the position of an equivalent point light source, and B corresponds to the image forming point in the vicinity of the ground. In order to reduce the velocity detection error, what is most effective is that B coincides with the ground. However, since the distance from the sensor to the ground differs depending on the vehicle type, it is necessary to set an optimal value according to the vehicle type. In this case, the value B can be modified according to the aforementioned [Expression 2] by adjusting the value A without modifying the lens shape. Accordingly, if the velocity sensor has a mechanism for adjusting the value A, it is possible to set an optimal B according to the vehicle type. For example, when using the two lenses explained above, A can be modified by adjusting the position of the second lens 2 and the position of the point light source. That is, it is possible to realize it by the mechanism for adjusting the mounting position of the second lens 2. Furthermore, by providing a vehicle height sensor for measuring the vehicle height and a mechanism for automatically adjusting the mounting position of the second lens 2 according to the output signal from the vehicle height sensor, it is possible to omit the manual adjustment step. It should be noted that since the ground vehicle velocity sensor of the present invention is a Doppler sensor, the ground vehicle velocity sensor can have the distance detection performance by applying the radar principle. Accordingly, the ground vehicle sensor itself can have the vehicle height detection function.

The Doppler sensor is formed by a circuit element such as an oscillator for generating a signal to be transmitted and a mixer for mixing the received signal with a local signal to generate a low-frequency signal, a transmission antenna for irradiating a transmission signal, a reception antenna for receiving a reflection signal (reflected wave), and the like. Moreover, when necessary, a circuit element such as an amplifier is added. These circuit elements are normally formed by HIC (Hybrid Integrated Circuit) as a combination of respective parts and MMIC. Recently, especially the MMIC is used in order to reduce the cost.

Furthermore, by configuring the antenna element as a plane circuit such as a microstrip antenna, the antenna element also can be formed on the MMIC. Furthermore, by forming all the necessary high-frequency circuits and the transmission/reception antenna as monolithic, a high-frequency signal other than the electromagnetic wave transmitted/received via the antenna need not be transmitted outside the MMIC and accordingly, a simple mounting method can be used. As one of the simple mounting methods, it is possible to use a resin mold package used in a general-purpose IC. Moreover, as has been described above, the first lens can be arranged in the vicinity of the antenna and can also be arranged directly on the package. When a non-metal package such as a resin mold package is used as the IC package, by forming the lens from the same material as the package, it is possible to perform a unitary molding by the metal mold in a mass production.

It should be noted that explanation has been given on the velocity sensor configuration using high-frequency electromagnetic wave such as a microwave and a millimeterwave, at least the equivalent effect can be obtained when it is replaced by a velocity sensor configuration using supersonic wave and light. Moreover, the beam shape of the electromagnetic wave emitted from the velocity sensor according to the present invention and the ground vehicle velocity sensor using it may be realized as various shapes if the beam width in the vicinity of the ground is smaller as compared to the beam width in the vicinity of the sensor. The aforementioned device configuration is effective in any of the beam shapes which are formed.

Description will now be directed to the velocity sensor and the ground vehicle velocity sensor using it according to some embodiments of the present invention with reference to the attached drawings. It should be noted that like components in these embodiments are denoted by like reference symbols.

Embodiment 1

Figure 15:
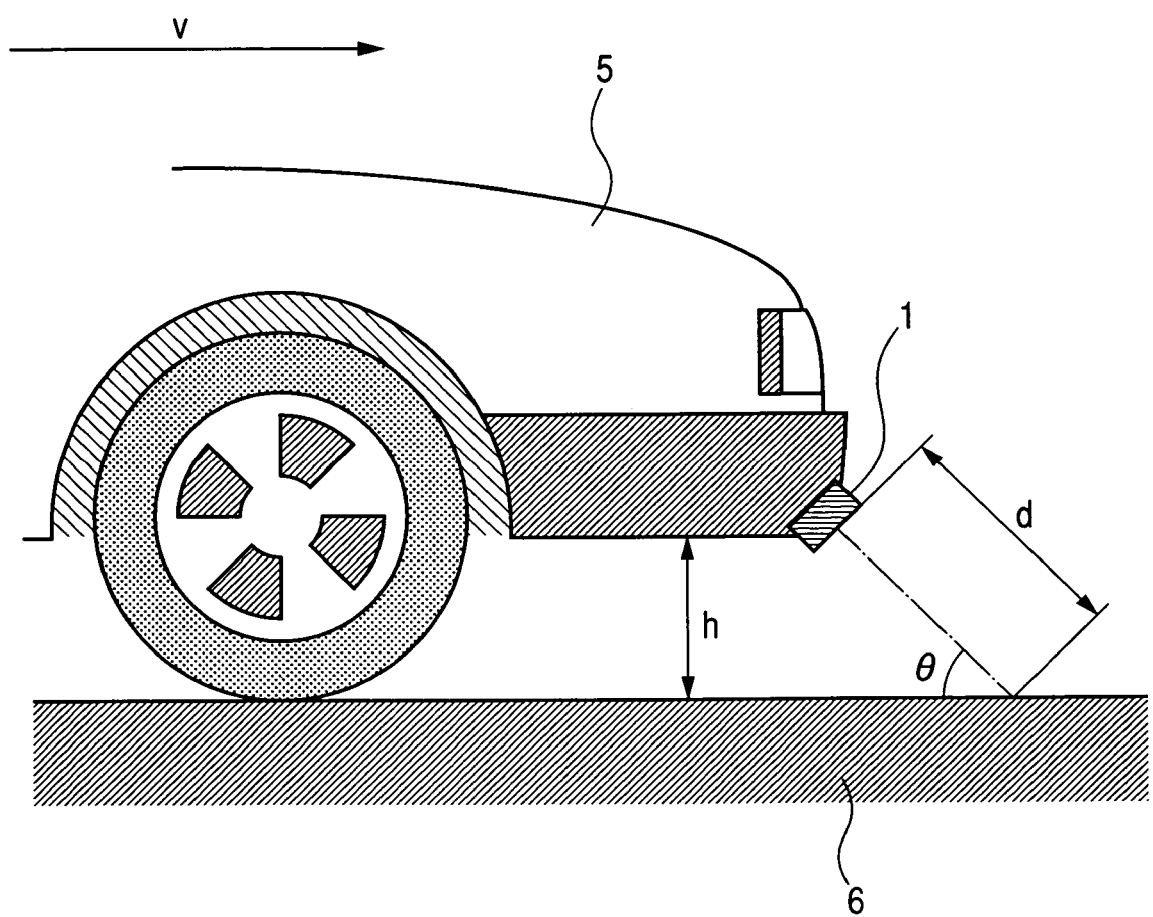
FIG. 15 shows the mounting state of the ground vehicle velocity sensor of the first embodiment.

FIG. 1 and FIG. 15 show a velocity sensor according to a first embodiment of the present invention. FIG. 15 shows an overview of a vehicle to which a ground vehicle velocity sensor using the velocity sensor of the present invention is attached. FIG. 1 shows a shape of the electromagnetic wave emitted from the velocity sensor of the present invention. When the velocity sensor of the present invention is used as the ground vehicle velocity sensor, the velocity sensor 1 is attached to the bottom surface, front surface, or back surface of the vehicle body 5 and the electromagnetic wave is emitted to the object, i.e., to the ground. Here, in FIG. 15, v represents a velocity of the vehicle 5, h represents an attachment height of the ground vehicle velocity sensor 1, d represents a distance from the electromagnetic wave emitting opening of the ground vehicle velocity sensor to the ground, and θ represents an angle defined by the direction of the velocity v with respect to the ground and the electromagnetic wave emitting direction. The sensor circuit unit 3 in FIG. 1 generates an electromagnetic wave to be emitted to the ground 6 and emits it from the transmission antenna. Furthermore, the reflection wave from the ground 6 is received by the reception antenna and mixed with a local signal by a mixer so as to generate a signal required for calculating the relative speed. The signal generated is outputted outside the velocity sensor 1 and transmitted to the signal processing device 22. Here, the signal generated by the mixer is normally a signal having a lower frequency (low-frequency signal) than the reflection signal received. The electromagnetic wave emitted from the sensor circuit unit 3 is formed into a beam shape by the lens 2 and emitted in the direction of the angle θ against the direction of the with-respect-to-ground velocity v toward the ground 6. The lens 2 is preferably a dielectric lens. Hereinafter, explanation is given on the case that the lens is a dielectric lens. Here, in order to improve the velocity detection accuracy, the beam 4 has such a shape that the beam width in the vicinity of the ground is smaller than the beam width in the vicinity of the sensor. Moreover, as the electromagnetic wave, it is preferable to use a well-known microwave or millimeter-wave.

It should be noted that in the configuration of FIG. 1, a dielectric lens is used for forming the beam but it is also possible to use other types of means such as a large-diameter antenna, array antenna, or a parabolic antenna capable of forming a desired beam shape. When the dielectric lens is used, it is possible to obtain an effect to prevent increase of the lens diameter. However, for example, when using an array antenna of a planar structure such as a microstrip patch antenna, it is possible to reduce the thickness of the sensor. When using the parabolic antenna, the parabola can be configured as a unitary block with the metal portion of the case and further the parabolic portion can have the first dielectric lens function. Accordingly, it is possible to reduce the number of parts and reduce the assembly cost. Moreover, it is possible to combine a plurality of beam forming means as is required. For example, when using the dielectric lens in combination with the array antenna, it is possible to reduce the number of antenna arrays by using the dielectric lens and reduce the cost of the antenna portion as well as reduce the thickness as compared when not using the array antenna.

Figure 4:
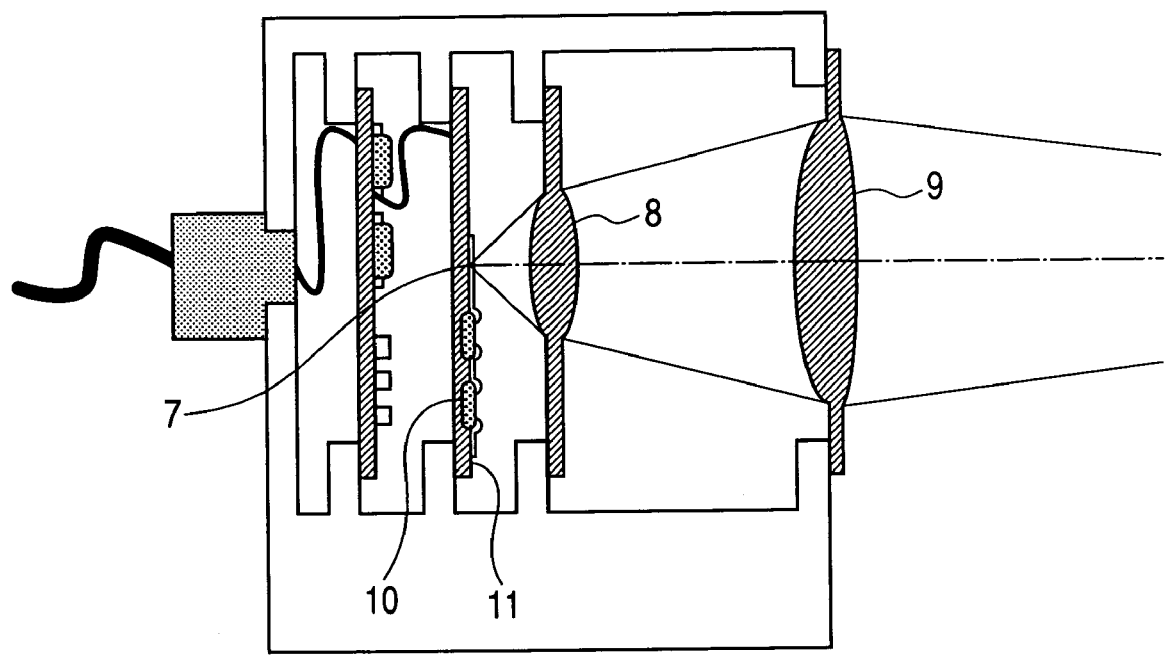
FIG. 4 is a cross section showing a velocity sensor according to the first embodiment.

FIG. 4 is a cross sectional view of the sensor portion in the velocity sensor shown in FIG. 1. In FIG. 4, a circuit block required for configuring the Doppler sensor is formed on the MMIC 10 and further the MMIC 10 is mounted on a high-frequency substrate 11. A transmission antenna for transmitting the electromagnetic wave and a reception antenna for receiving the reflection signal are formed as a planar antenna 7 on the high-frequency substrate 11. The electromagnetic wave emitted from the antenna 7 has an irradiation angle reduced by a first dielectric lens 8 and such a beam shape that the beam width in the vicinity of the ground (for example, it can be defined as the maximum diameter of the beam cross section) is smaller than or almost identical to the beam width in the vicinity of the electromagnetic wave emitting opening of the sensor.

Figure 5:
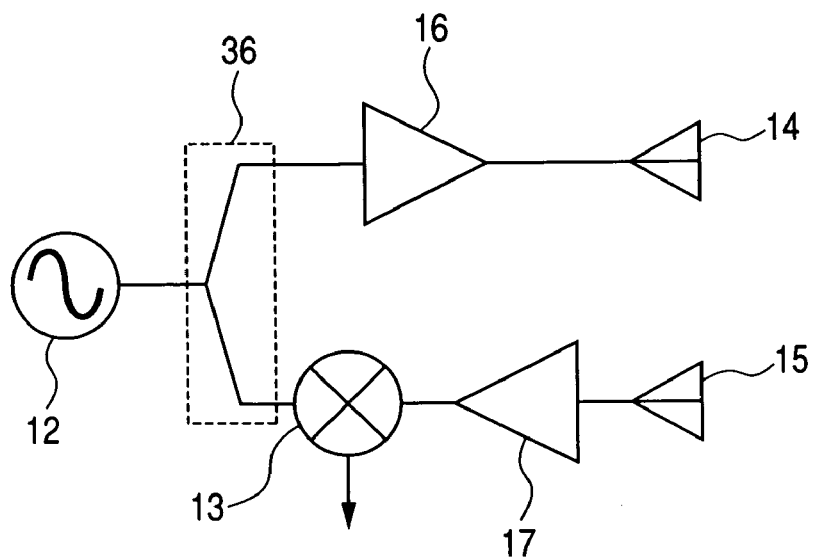
FIG. 5 is a block diagram showing circuit of the Doppler sensor.

FIG. 5 shows an example of a block diagram of the Doppler sensor used in this embodiment. The Doppler sensor includes an oscillator 12 for generating a signal, a transmission antenna for emitting a transmission signal, a reception antenna 15 for receiving a reflection signal, and a mixer for mixing the received reflection signal with the local signal so as to generate a low-frequency signal required for calculating a relative speed. Here, the Doppler sensor may also include a power amplifier 16 for amplifying the transmission signal and a low noise amplifier 17 for amplifying the received reflection signal which are used when a sufficient sensitivity cannot be obtained due to the use condition of the velocity sensor. Thus, it is possible to compensate the sensitivity of the Doppler sensor for the electromagnetic wave transmitted and received.

Next, explanation will be given on the operation of the circuit configuration shown in FIG. 5. Firstly, a signal of a desired frequency is generated. The frequency signal is preferably a high-frequency signal such as a well-known microwave and a millimeterwave. The signal is divided by a divider 36 and one of the divided signal is transmitted to a transmission antenna 14 directly or after being amplified by a power amplifier 16 and emitted to from the transmission antenna 14 to the object, i.e., the ground. A reflection signal reflected from the ground is received by a reception antenna 15 and inputted to a mixer 13 directly or after being amplified by a low-noise amplifier 17. In the mixer 13, the signal identical to the original transmission signal is mixed with the reflection signal received as a local signal, thereby generating a low-frequency signal having a frequency equal to the frequency shift amount between the transmission signal and the reflection signal caused by the Doppler effect. This low-frequency signal is subjected to signal processing and its frequency component is detected, thereby calculating the velocity from [Expression 1].

Figure 6:
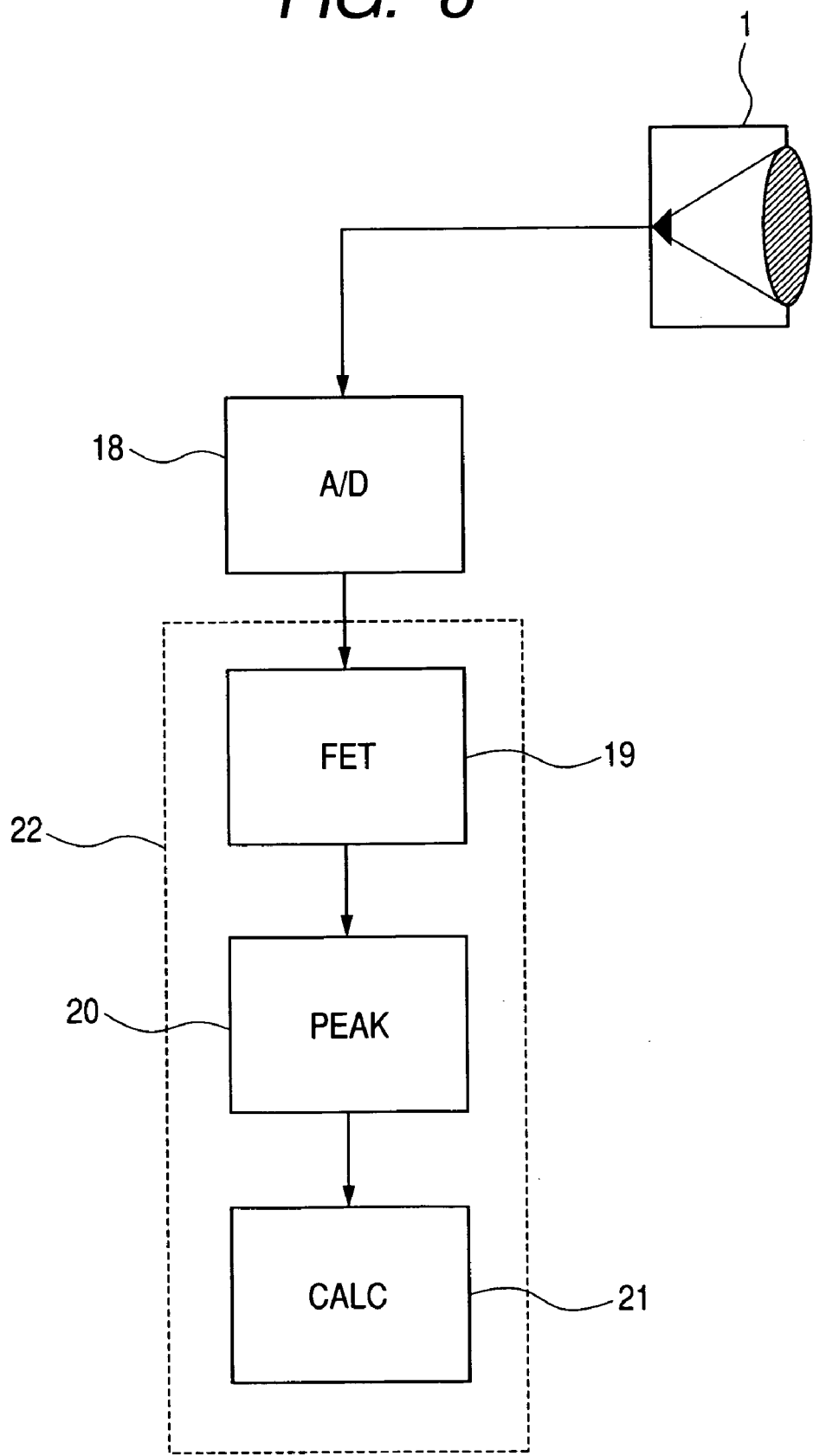
FIG. 6 shows a flow of signal processing.

FIG. 6 shows a flow of signal processing in the present embodiment and function blocks constituting it. An analog signal outputted from the velocity sensor 1 is converted into a digital signal by an A/D convert 18 and inputted to a signal processing unit 22. In the signal processing unit, firstly, an FFT 19 performs signal processing such as FFT (Fast Fourier Transform) and performs conversion from a time domain signal to a frequency domain signal. After this, Peak 20 detects a signal spectrum corresponding to a reflection signal from the ground, from the signal spectrum. Furthermore, Calc 21 calculates a velocity from the frequency of the signal spectrum by using the equation of [Expression 1].

It should be noted that the signal processing unit 22 is preferably installed at an arbitrary position of the vehicle body 5. However, the present invention is not limited to this. For example, under the condition that the vehicle running range is limited to a small range, the signal processing unit 22 may be installed outside the vehicle body 5 via a radio communication unit. When the signal processing unit 22 is installed on the vehicle body 5, there is a merit that stable processing can be obtained not depending on the environment outside the vehicle body (for example, communication environment when the signal processing is performed outside via a radio communication unit). On the other hand, when the signal processing unit 22 is installed outside the vehicle body 5, it is possible to configure the sensor portion with a simpler structure and manufacture the sensor to be mounted on the vehicle at a lower cost.

Moreover, in the present embodiment, explanation has been given on the case that the A/D converter 18 is installed outside the velocity sensor 1. However, the present invention is not limited to this. For example, the A/D convert 18 may be installed inside the case of the velocity sensor 1. When the A/D converter 18 is installed outside the velocity sensor 1, only an analog circuit including the high-frequency circuit portion exists in the case and accordingly, there is a merit that it is possible to reduce the noise caused by the A/D converter, especially the noise coming into the sensor analog circuit portion via the power line. On the other hand, when the A/D converter 18 is installed in the case of the velocity sensor 1, the signal outputted to outside the case is a digital signal and there is a merit that it is possible to obtain a stable signal against the noise existing outside the case.

Figure 20:
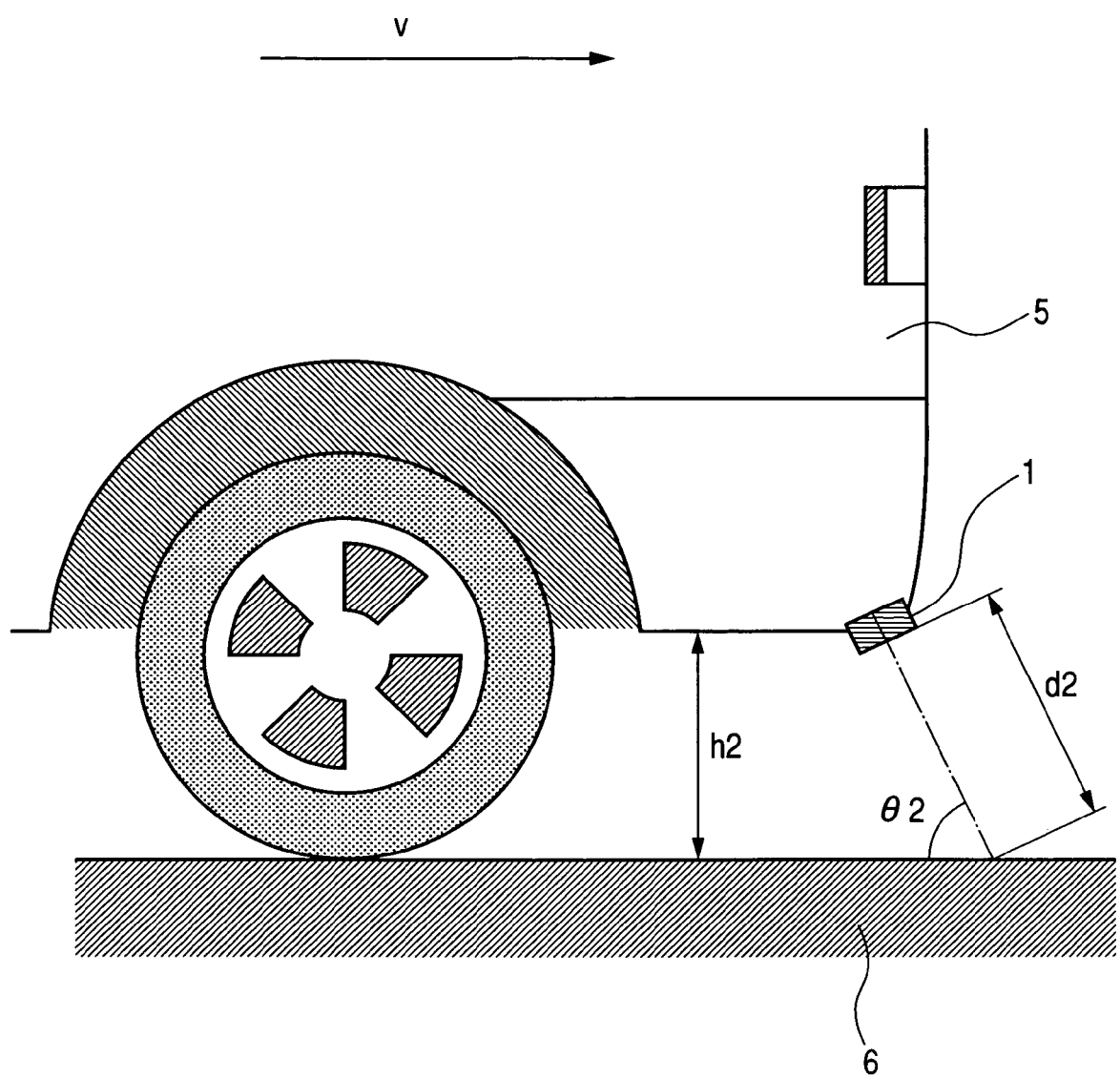
FIG. 20 is a perspective view of a vehicle having a height different from the vehicle of FIG. 15.

FIG. 20 is an overview of a vehicle having a vehicle height h different from the vehicle 5 shown in FIG. 15. As shown in FIG. 20, when the sensor is mounted on a vehicle type having a vehicle h2 greater than h such as a large truck, if the velocity sensor 1 is mounted at the same angle θ shown in FIG. 15, the distance d2 between the velocity sensor 1 and the ground 6 becomes greater and it is expected that the sensitivity of the velocity sensor 1 becomes insufficient. In this case, by mounting the velocity sensor 1 in such a manner that the irradiation angle θ2 of the electromagnetic wave from the velocity sensor 1 is greater than θ, it is possible to maintain the distance d2 between the velocity sensor 1 and the ground 6 to be identical to the d in FIG. 15, thereby compensating the sensitivity shortage of the velocity sensor 1. On the contrary, when the sensor is mounted on a vehicle type having a vehicle height h2 is lower than h, the distance d2 between the velocity sensor 1 and the ground 6 becomes smaller and the sensitivity of the velocity sensor 1 becomes excessive if the velocity sensor 1 is attached at the same angle θ as shown in FIG. 15. Accordingly, the irradiation angle θ2 of the electromagnetic wave of the velocity sensor 1 is made small until the distance d2 between the velocity sensor 1 and the ground 6 is identical to d in FIG. 15, thereby maintaining the optimal sensitivity of the velocity sensor 1. In this case, there is a merit that the velocity resolution of the velocity sensor 1 is improved for the portion that the irradiation angle θ2 is reduced.

As thus far been described, according to the present embodiment, it is possible to suppress the area of the electromagnetic wave irradiated to the ground and accordingly, it is possible to reduce the detection error. It should be noted that explanation has been given on the case that two dielectric lenses are used but the same effect can also be obtained when using three or more dielectric lenses. Moreover, as has been described above, in order to obtain an equivalent beam shape, it is also possible to use a large-diameter antenna, an antenna array, a parabolic antenna, or a combination of these in addition to the dielectric lenses.

Furthermore, in the velocity sensor according to the present invention, the transmitter for transmitting a transmission signal (transmission electromagnetic wave) and a receiver for receiving a reflection signal (reflection electromagnetic wave) are installed in positions near to each other inside the case of a single sensor portion. Accordingly, unlike the configuration where the receiver is arranged apart from the transmitter so as to receive the side lobe of the reflection wave as a reflection signal, even if the vehicle height h is changed, it is possible to assure the optimal detection distance d corresponding to the detection sensitivity unique to the velocity sensor 1 by appropriately setting the irradiation angle θ of the electromagnetic wave without changing the device size of the velocity sensor 1. There is a case that the velocity resolution is also improved. From a different viewpoint, by appropriately setting the irradiation angle θ of the electromagnetic wave, the velocity sensor 1 can be applied to various types of vehicle having a different height h within a predetermined range without modifying the detection sensitivity (detection performance) unique to the velocity sensor 1. That is, according to the present embodiment, there is no need of designing/manufacturing separate velocity sensor 1 for each type of vehicles and it is possible to improve the circulation and reduce the design cost.

Embodiment 2

Figure 14:
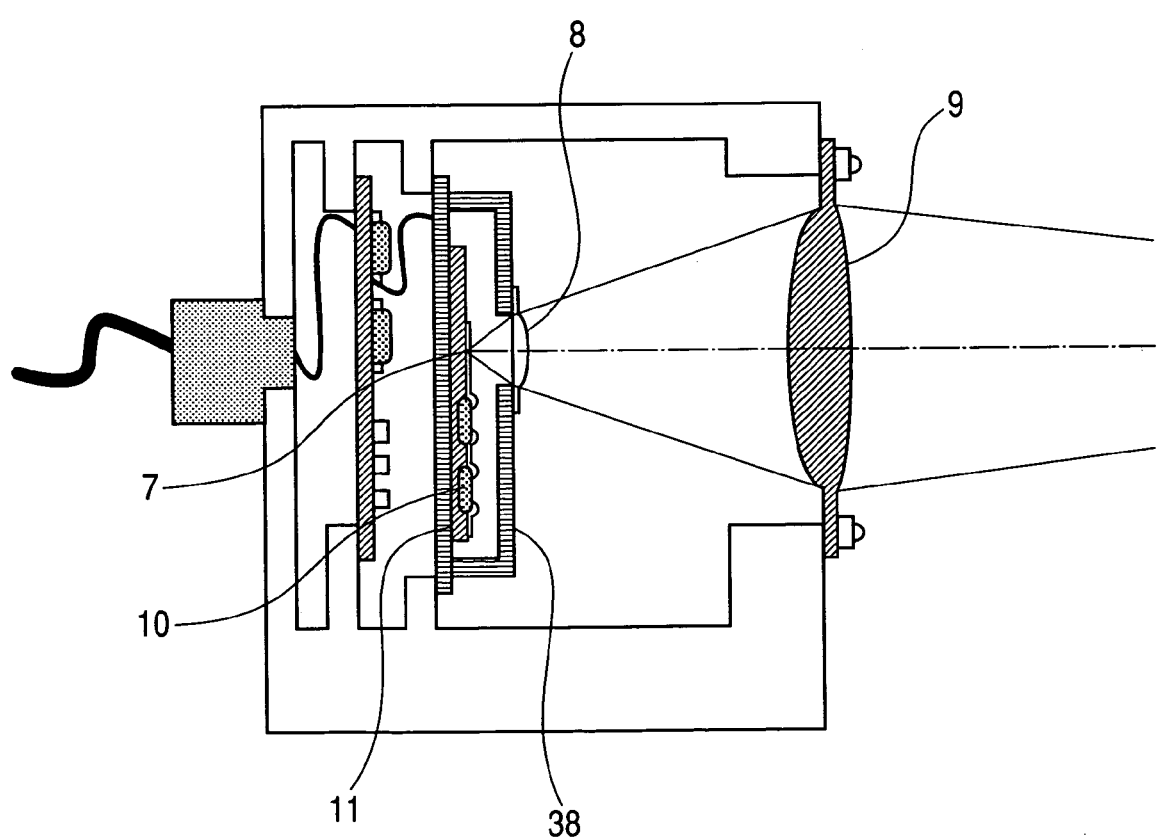
FIG. 14 is a cross sectional view showing a velocity sensor according to the second embodiment.

FIG. 14 is a cross sectional view of the sensor portion in the velocity sensor configuration according to another embodiment of the present invention. In FIG. 14, the circuit block required to constitute the Doppler sensor is formed by MMIC 10 and further the MMIC 10 is mounted on a high-frequency substrate 11. The transmission antenna for transmitting the electromagnetic wave and the reception antenna for receiving the reflection signal are formed as a planer antenna 7 on the high-frequency substrate 11. The high-frequency circuits are sealed by a package 38 for high frequency. As the high-frequency package 38, for example, a metal package is used. Hereinafter, explanation will be given on the case using a metal package. The package 38 has a window through which the electromagnetic wave emitted from the antenna passes. A first dielectric lens 8 is arranged at the window portion. By this first dielectric lens 8 and a second dielectric lens 9, the beam shape is formed so that the irradiation area of the electromagnetic wave in the vicinity of the ground is smaller than the area of the electromagnetic wave emitting opening of the sensor.

According to the present embodiment, the high-frequency circuit portion can be separately mounted and sealed in the package and accordingly, it is possible to separate a comparatively expensive assembly step requiring the high-frequency circuit mounting technique from the other assembly step. Thus, it is possible to improve the degree of freedom of the manufacturing process of the velocity sensor or reduce the mounting cost of the portion functioning as the Doppler sensor circuit in the velocity sensor configuration.

Embodiment 3

Figure 7:
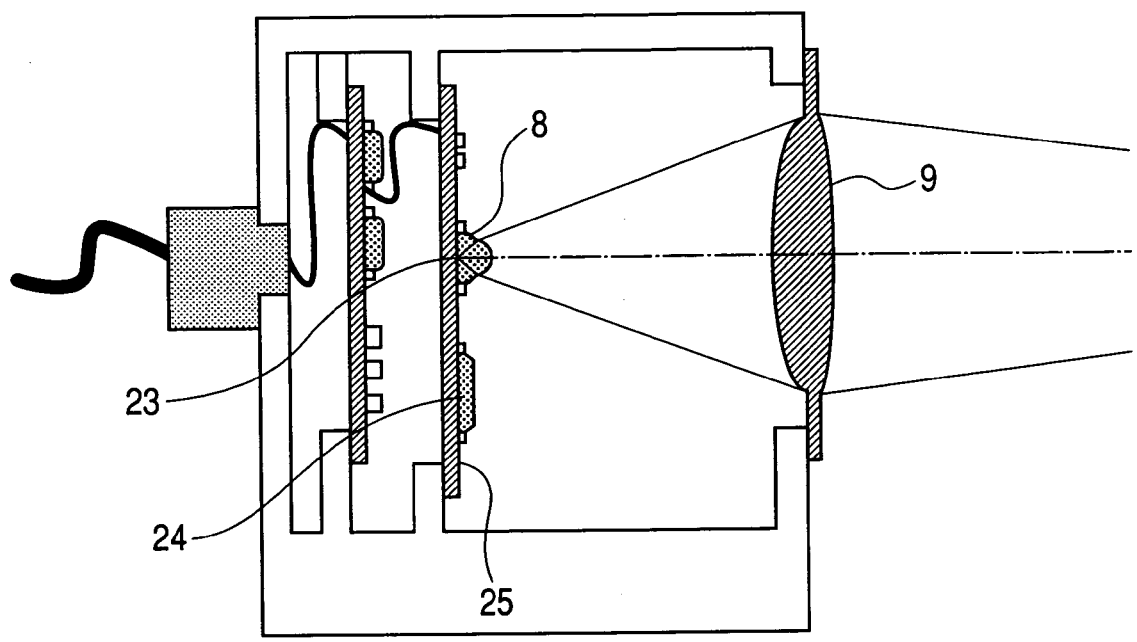
FIG. 7 a cross sectional view showing a velocity sensor according to the third embodiment.

FIG. 7 is a cross sectional view of the sensor portion in the velocity sensor configuration according to a third embodiment of the present invention. An active circuit and an antenna required for the Doppler sensor are sealed in an IC package 23. Furthermore, the IC package 23 has a first dielectric lens 8 at the side where the electromagnetic wave is emitted.

Figure 8:
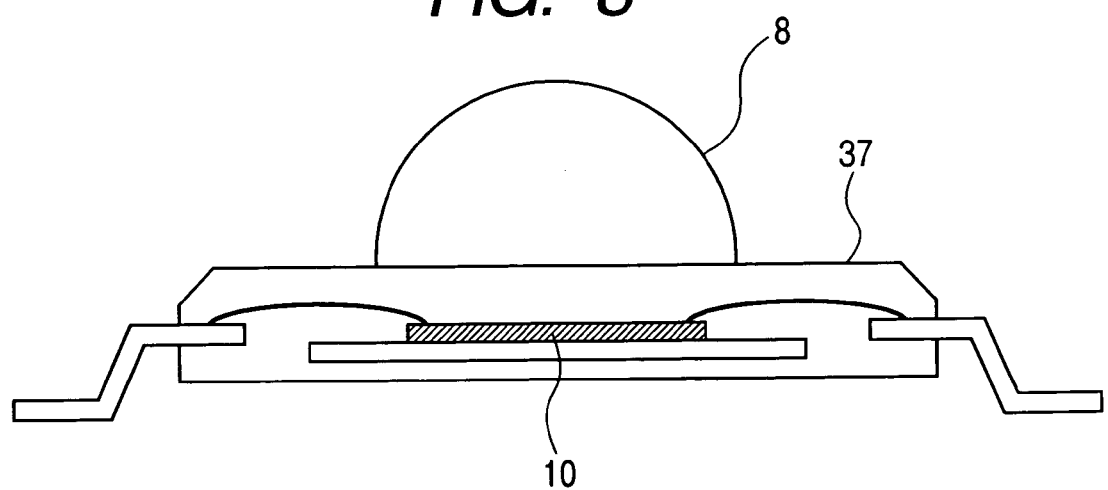
FIG. 8 is a cross sectional view showing a sensor circuit portion in the third embodiment.
Figure 16:
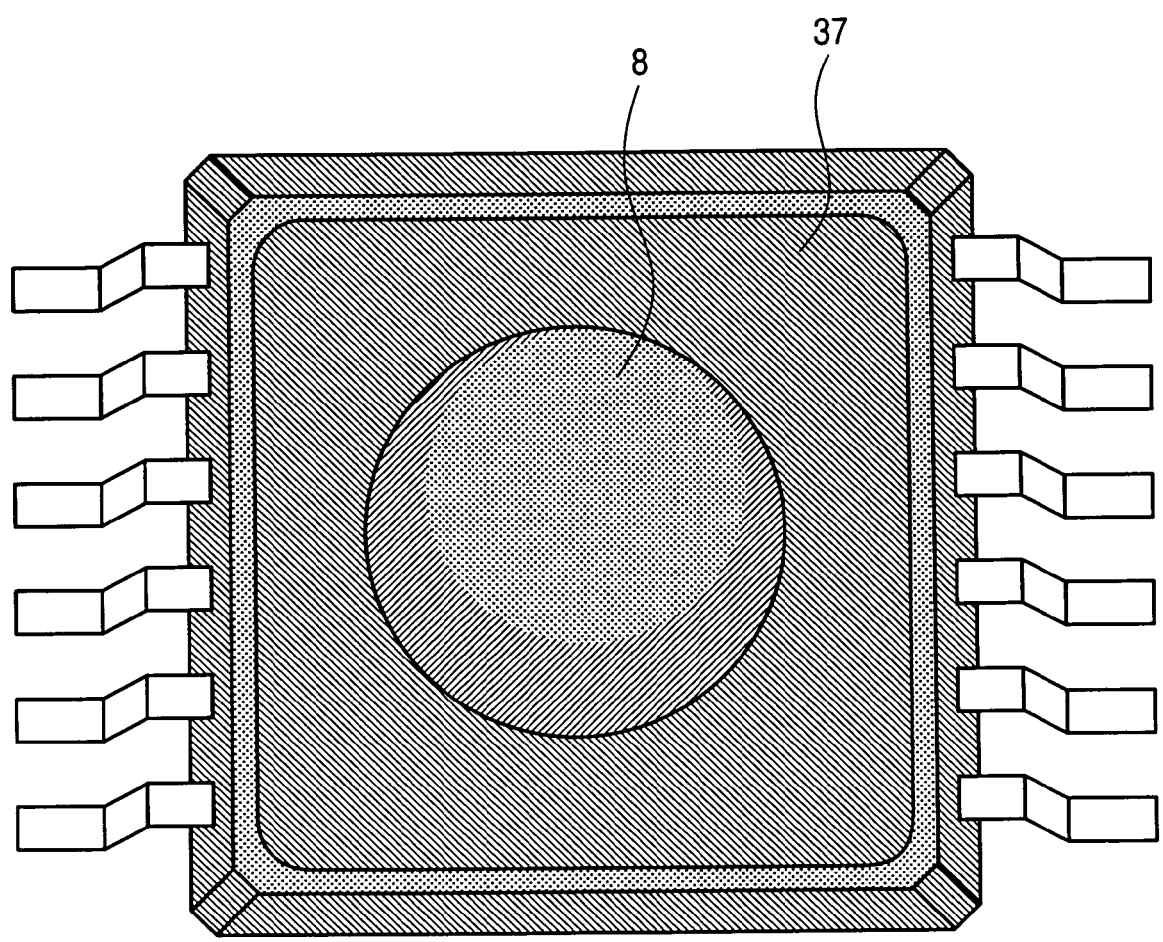
FIG. 16 shows a sensor circuit portion of the third embodiment viewed from above.
Figure 17:
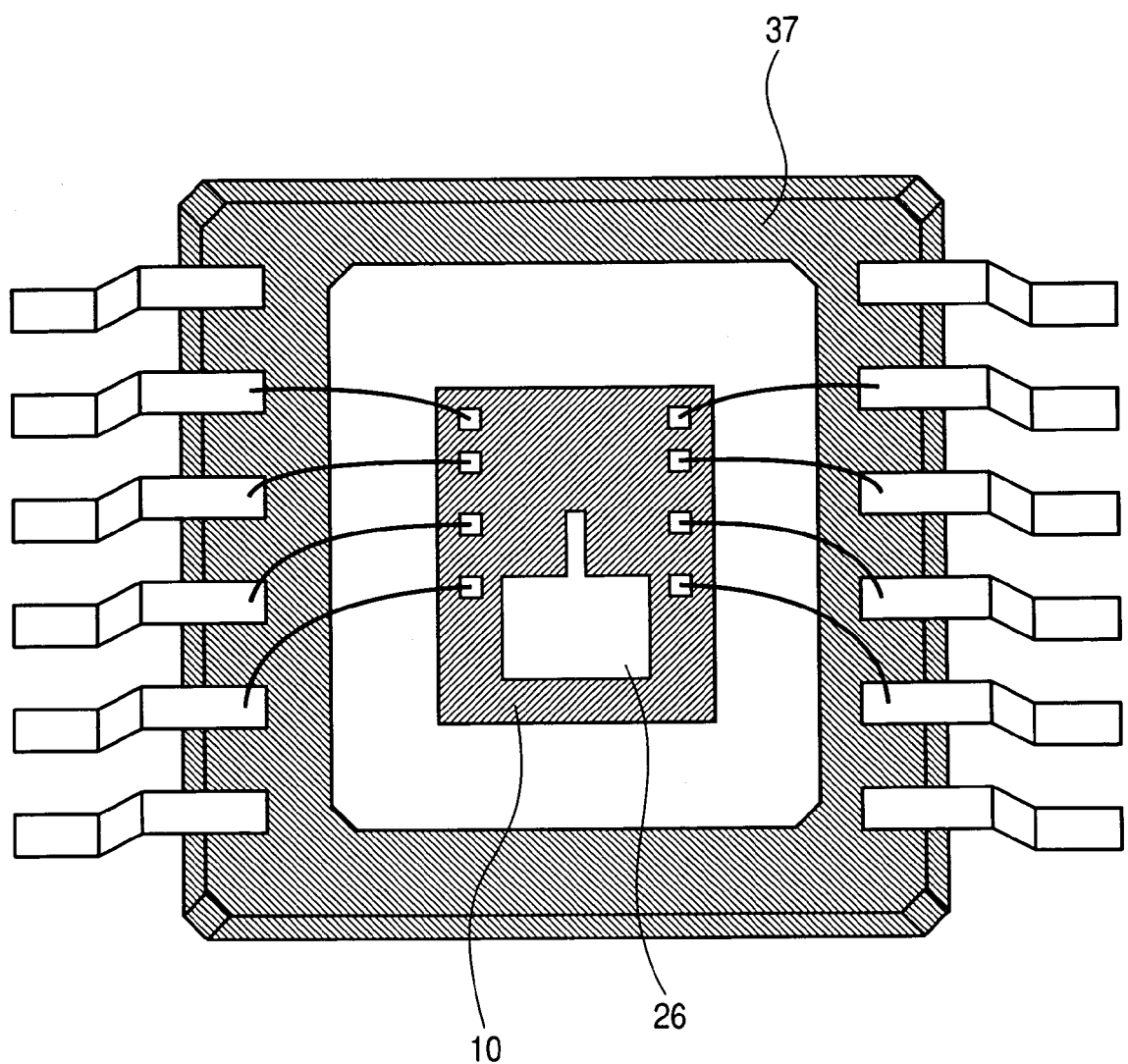
FIG. 17 is a cross sectional view of the sensor circuit portion of the third embodiment about the MMIC portion.

FIG. 8 is a cross sectional view of the IC package 23. FIG. 16 is a plan view of the IC package 23. Moreover, FIG. 17 is an overview of a cross section of the IC package 23 about a plane parallel to a mounting surface of the IC package passing the MMIC portion in the IC package. The oscillator, the mixer, the mixer, the power amplifier, the low-noise amplifier, the transmission antenna, and the reception antenna can be respectively configured by using a separate MMIC and a high-frequency substrate but when they are formed monolithic on a single MMIC, it is possible to reduce the cost. In this embodiment, explanation will be given on a case when they are formed as a single MMIC 10. By integrating all the high-frequency circuits to be monolithic, it becomes unnecessary to transmit a high-frequency signal outside the MMIC 10 other than the electromagnetic wave emitted or received by the antenna and accordingly it is possible to use a cheap mounting method. In this embodiment, the MMIC 10 is mounted by a resin mold package 37.

Furthermore, on the upper portion of the resin mold package 37 in the figure, a first dielectric lens 8 is formed. The dielectric lens 8 is preferably formed by the same material as the resin mold package 37. In this case, a unitary formation is possible by a metal mold in the mass production. On the MMIC 10, a transmission antenna and a reception antenna are formed, for example, as a planar antenna such as a microstrip patch antenna. Here, the manufacturing cost of the MMIC depends on its area, the antenna 26 formed on the MMIC 10 is preferably a patch antenna having a small number of elements nor arrayed, for example, one element. Especially when using an antenna having a small number of elements, normally, the electromagnetic wave emitted from the antenna has a wide irradiation angle. The first dielectric lens 8 narrows the irradiation angle of the electromagnetic wave emitted from the antenna and introduces almost all of the electric wave emitted into the second dielectric lens, thereby reducing the loss. Furthermore, by using the second dielectric lens, the electromagnetic wave is focused. Here, when the second dielectric lens is configured so that the electromagnetic wave is focused in such a manner that the electromagnetic wave beam width (which can be defined, for example, as the maximum diameter of the beam cross section) in the vicinity of the object, i.e., in the vicinity of the ground is smaller than or almost identical to the electromagnetic wave beam width in the vicinity of the electromagnetic wave emitting opening of the sensor, i.e., the maximum diameter of the second dielectric lens, it is possible to reduce the detection error from the aforementioned principle.

Figure 9:
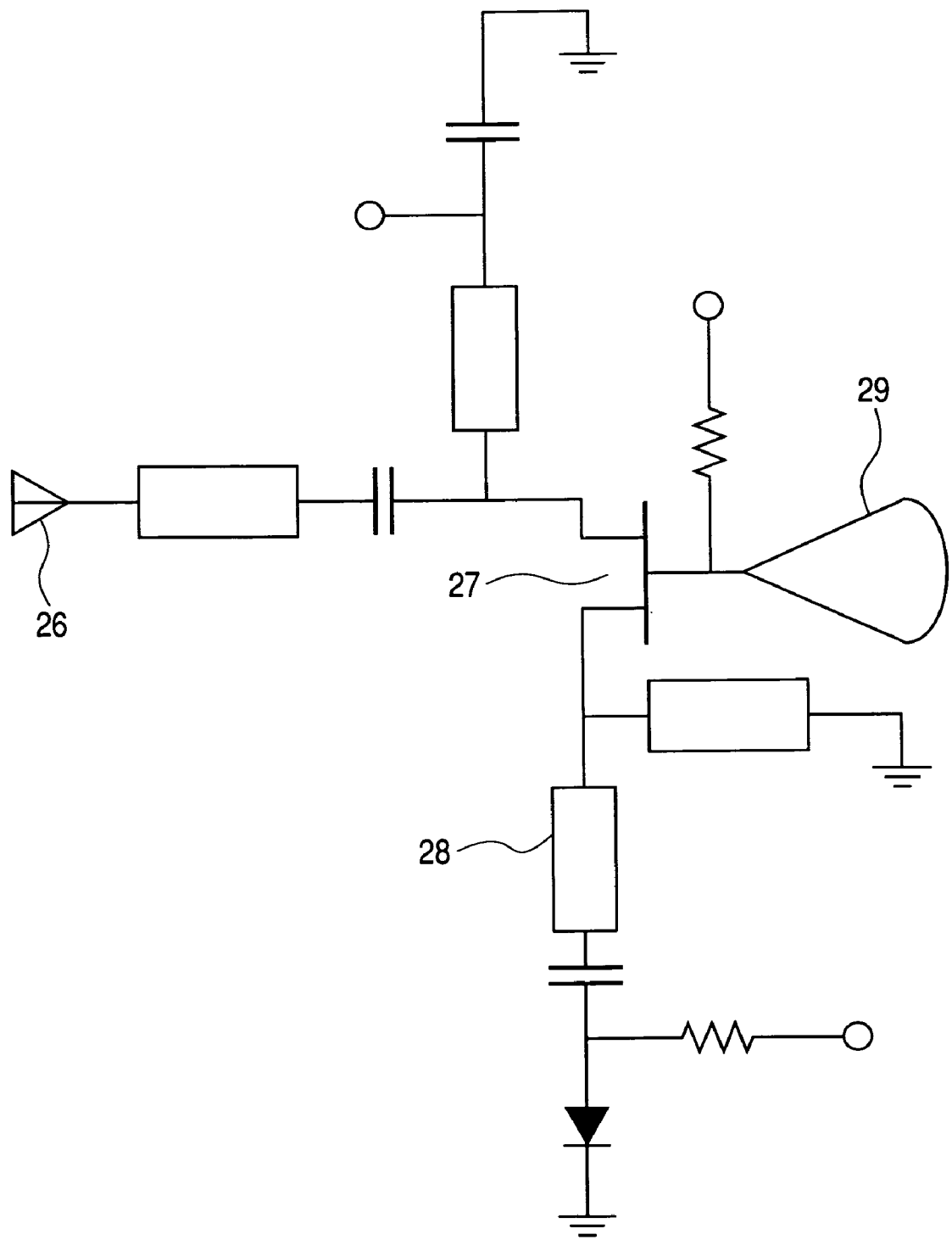
FIG. 9 is a sensor circuit diagram of the third embodiment.

FIG. 9 is an example of a circuit diagram of the MMIC 10. In this circuit, the oscillator is a self mixing oscillator and a single FET (Field Effect Transistor) 27 plays the roles of the oscillator and the mixer required for the Doppler sensor. The FET 27 is subjected to the negative feedback by a radial stub 29 and generates negative resistance. The FET 27 realizes oscillation operation of a desired frequency by resonance with the frequency to be oscillated by an open stub type resonator 28. The antenna 26 on the MMIC 10 serves as the transmission antenna and the reception antenna. The antenna 26 emits a signal generated by the FET 27 and simultaneously with this, receives the reflection signal from the object. The reflection signal received is mixed by the FET 27 so as to generate a low-frequency signal having a frequency equal to a frequency shift amount between the transmission signal and the reflection signal caused by the Doppler effect.

By the way, in the configuration of the present embodiment, the distance between the antenna 26 on the MMIC 10 and the first dielectric lens 8 is as small as the order of 1 mm or less. Accordingly, when performing focusing only by the first dielectric lens 8 without using the second dielectric lens 9, as shown in [Expression 3], the first dielectric lens should be machined with a very high accuracy.

Figure 18:
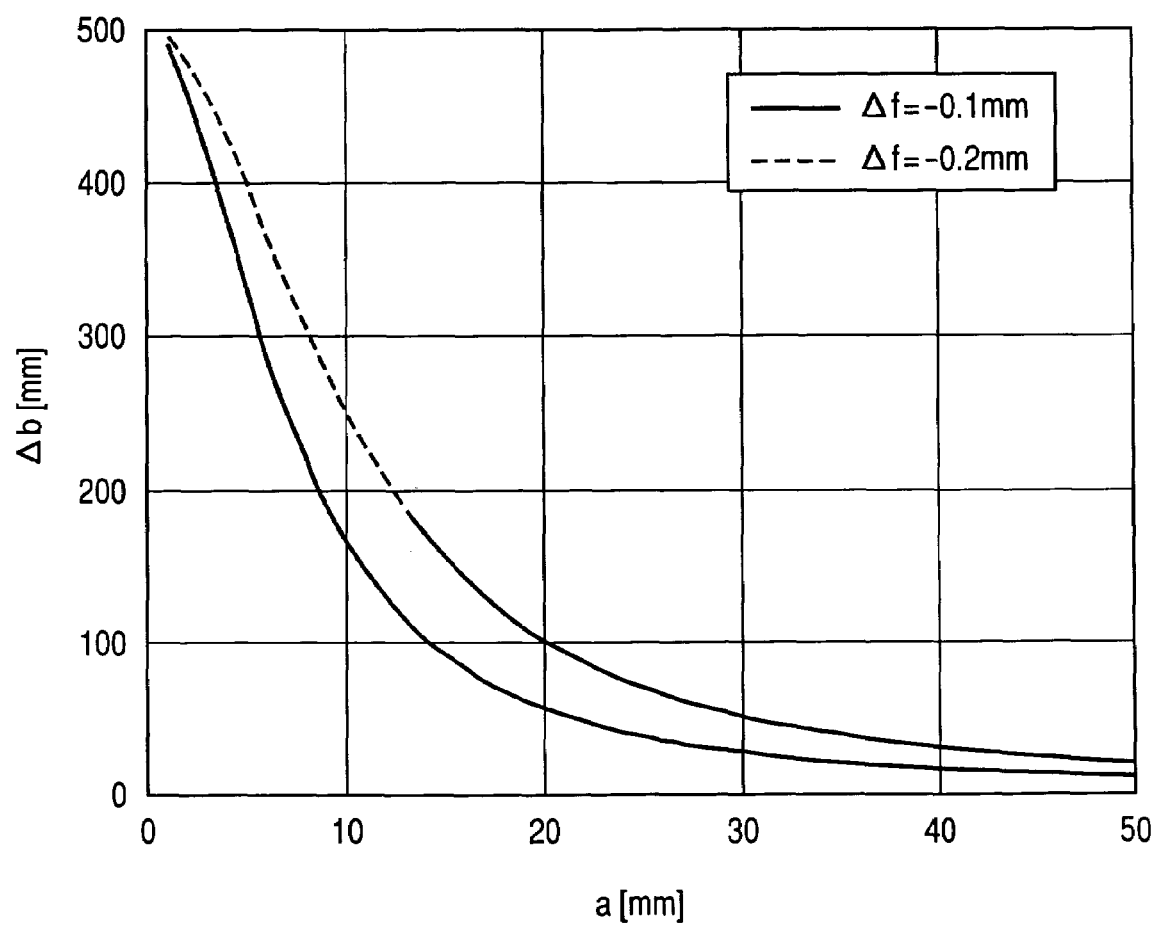
FIG. 18 shows an error between the distance between the antenna and the lens and the image forming point.

For example, FIG. 18 shows a distance error Δb between the lens and the focal point caused when an error is generated in the focal point f in a lens manufacturing when the distance b between the lens and the focal point is designed to be 500 mm. In FIG. 18, plotting is performed along the horizontal axis of distance "a" between the antenna and the lens when the lens focal point error Δf is −0.1 mm and when −0.2 mm. As shown in FIG. 18, when the distance between the antenna 26 and the first dielectric lens 8 on the MMIC 10 is as small as 1 mm in this embodiment, the focal point error Δb becomes very large.

In order to solve this problem, it is necessary to increase the distance "a" between the dielectric lens and the antenna. In this case, as has been described above, the electromagnetic wave emitted from the antenna 26 mounted don the MMIC 10 has a very large irradiation angle. The diameter of the dielectric lens covering it becomes very large. To cope with this, in this embodiment, a second dielectric lens 9 is used in addition to the first dielectric lens 8. Here, the first dielectric lens 8 is set to reduce the irradiation angle of the electromagnetic wave but the image formation point of the electromagnetic wave is still at an infinite far point so that a focal point is obtained at a desired distance by the second dielectric lens 9.

This embodiment has a merit that it is possible to configure the Doppler sensor portion and the first dielectric lens at a low manufacturing cost.

Embodiment 4

Figure 10:
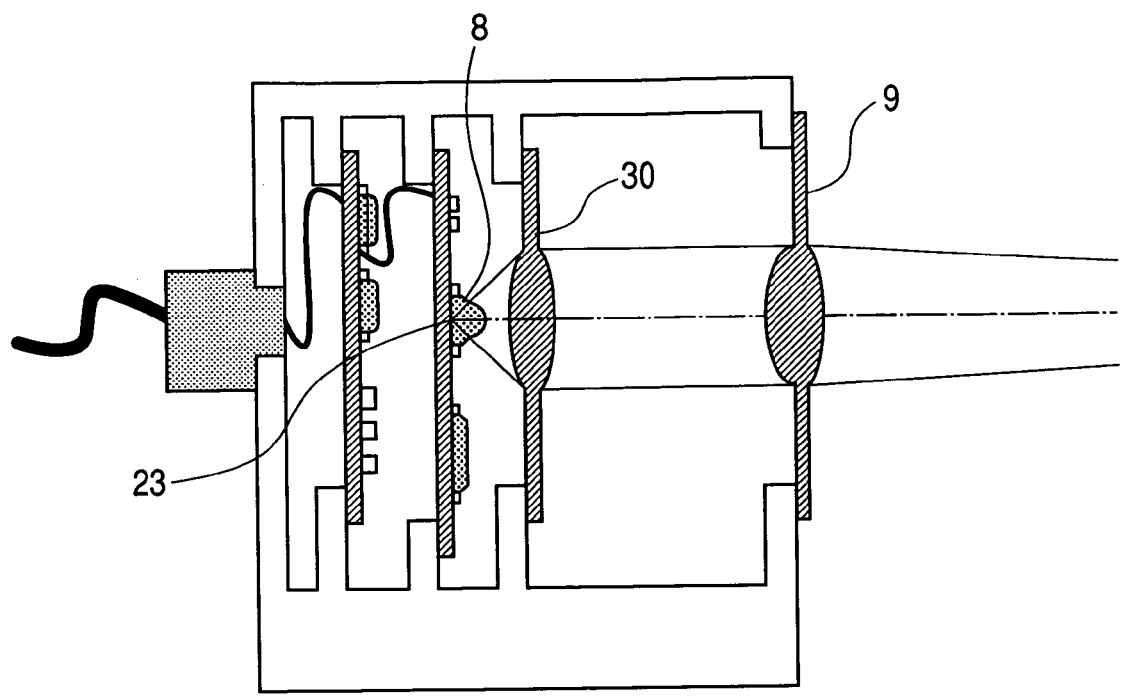
FIG. 10 is a cross sectional view showing a velocity sensor according to the fourth embodiment.

FIG. 10 is a cross sectional view of a sensor portion in the velocity sensor configuration according to a fourth embodiment of the present invention. In this embodiment, a plurality of dielectric lenses, especially three dielectric lenses are used in combination to constitute the sensor portion of the velocity sensor. In this embodiment, a third dielectric lens 30 is arranged between the first dielectric lens 8 and the second dielectric lens 9. The Doppler sensor circuit portion is mounted on a resin mold package and further, the first dielectric lens is arranged directly on the resin mold package, thereby constituting the IC package 23 in the same way as in the aforementioned third embodiment. However, specific configuration of the Doppler sensor circuit portion and the position of the first dielectric lens are not limited to this. In this embodiment, the antenna 26 arranged on the MMIC 10 emits an electromagnetic wave having a wide irradiation angle which is narrowed by the first dielectric lens 8. Furthermore, the beam formation is performed by the combination of the second dielectric lens 9 and the third dielectric lens 30.

According to the present embodiment, by using a plurality of dielectric lenses, there is a merit that the degree of freedom for beam formation becomes large. It should be noted that when four or more dielectric lenses are arranged, the degree of freedom becomes further larger.

Embodiment 5

Figure 11:
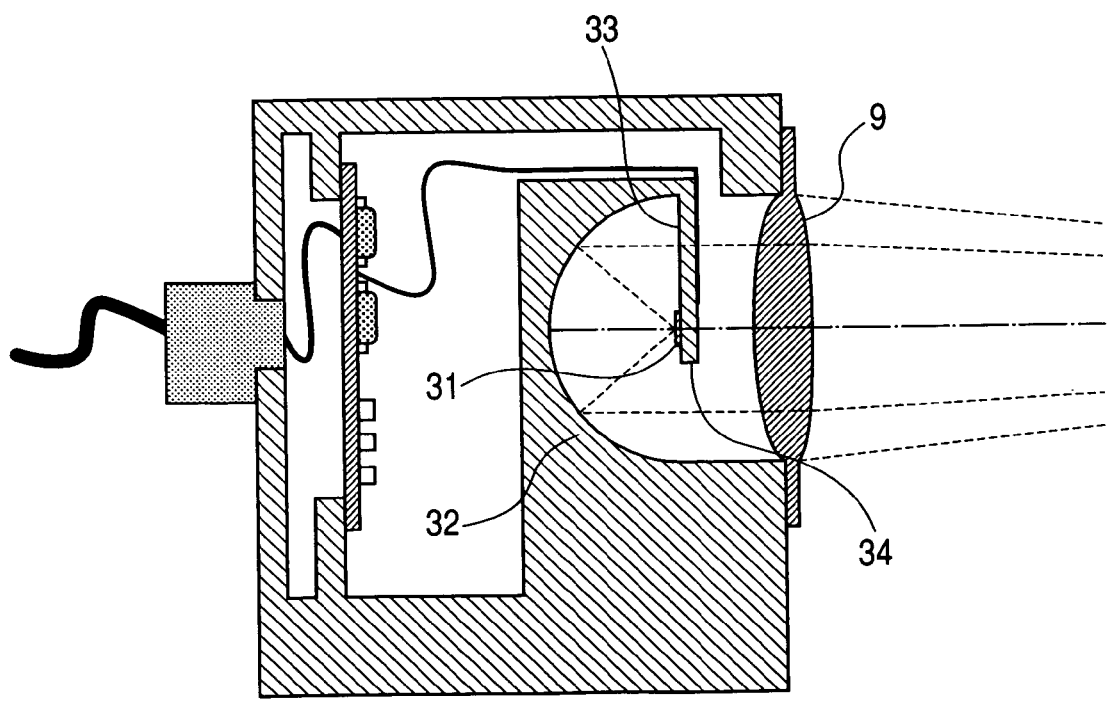
FIG. 11 is a cross sectional view showing a velocity sensor according to the fifth embodiment.
Figure 12:
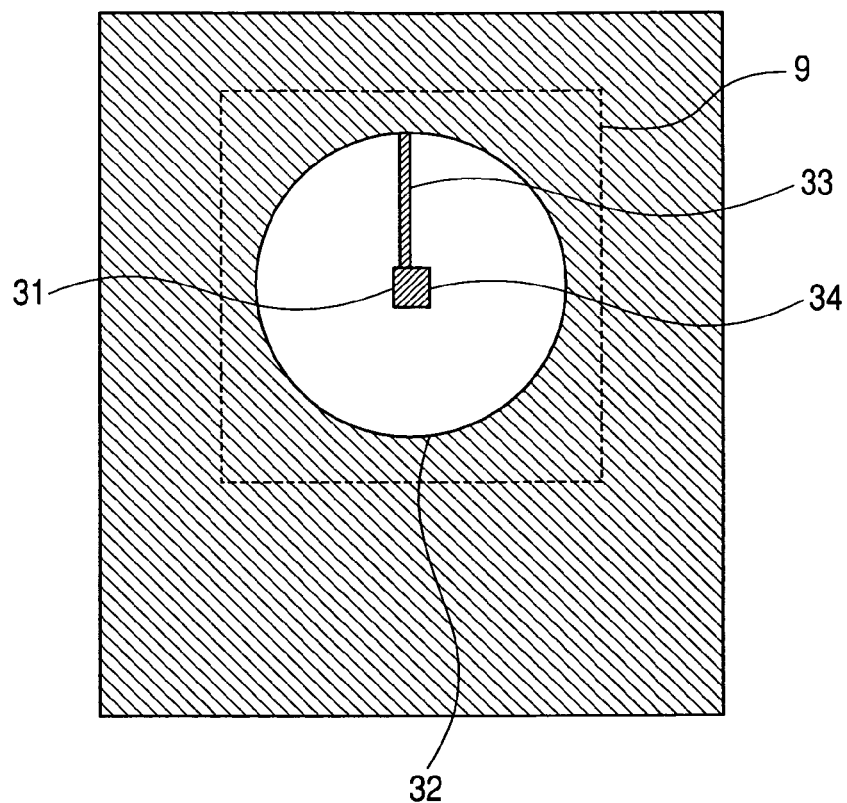
FIG. 12 a front view of the velocity sensor of the fifth embodiment.

FIG. 11 is a cross sectional view of a sensor portion of a velocity sensor according to a fifth embodiment. Moreover, FIG. 12 corresponds to FIG. 11 viewed from the front, i.e., the sensor portion viewed in the direction opposite to the electromagnetic wave irradiation direction from the center right side of FIG. 11. It should be noted that in FIG. 11, the second dielectric lens is not depicted for simplifying the view. In this embodiment, the electromagnetic wave emitted from the Doppler sensor 31 is reflected by a side wall 32 having a parabolic shape (rotary parabolic plane shape). The electromagnetic wave reflected is further focused by the second dielectric lens 9. It should be noted that when an antenna of the parabolic shape is used, it is necessary to irradiate the electromagnetic wave toward the side wall of the parabolic shape and accordingly, the Doppler sensor is preferably mounted on a mounting table 34 movably or fixedly supported by a sufficiently slender column 33.

According to this embodiment, the parabolic antenna is built in the sensor portion casing and the sensor portion casing can have the function of the first dielectric lens. Accordingly, there is no need of preparing the first dielectric lens as a separate part. Thus, it is possible to reduce the number of parts and reduce the manufacturing cost.

Embodiment 6

Figure 13:
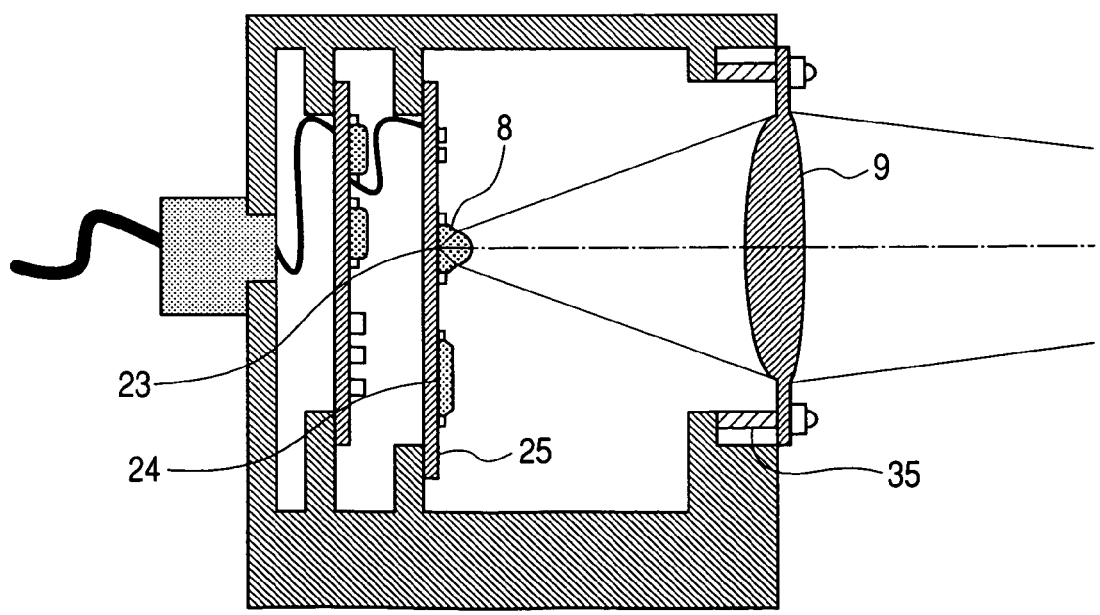
FIG. 13 is a cross sectional view showing a velocity sensor according to the sixth embodiment.

FIG. 13 is a cross sectional view of a sensor portion of the velocity sensor configuration according to a sixth embodiment of the present invention. This embodiment is characterized in that the sensor portion includes an adjustment mechanism 35 for adjusting the position of the second dielectric lens 9. When mounting the ground vehicle velocity sensor on a vehicle, the height h from the sensor to the ground may differ depending on the type of the vehicle. In this case, in order to obtain an optimal beam shape formed by the dielectric lens, it is preferable that the position of the second dielectric lens 9 be adjusted by the adjustment mechanism 35.

Figure 19:
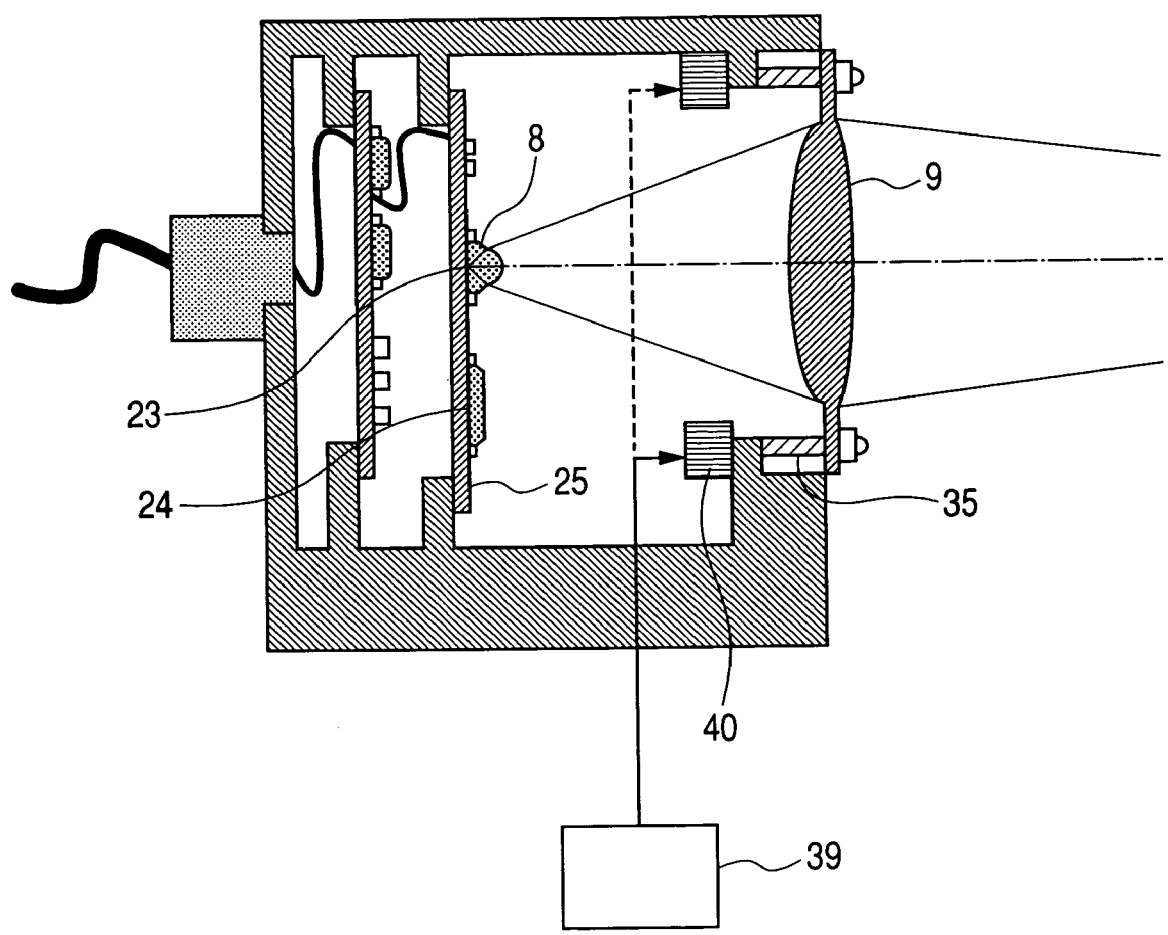
FIG. 19 is a cross sectional view showing a velocity sensor according to the sixth embodiment.

It should be noted that the vehicle height is determined almost uniquely depending on the vehicle type and accordingly, the position of the second dielectric lens 9 can be determined by the type of the vehicle on which the velocity sensor is mounted. However, for example, depending on the air pressure and wear-out degree of tires used by the vehicle or other conditions, even if the vehicle type is the same, the vehicle height may be different between the vehicles of the same type because of the change by the time from the initial state. Moreover, the vehicle height varies depending on the fluctuation of the suspension because of the road environment. To cope with these various conditions, as shown in FIG. 19, a distance sensor 39 for judging the vehicle height is arranged as a separate part to be externally mounted, for example, and according to the detection output of the sensor, the control device 40 can adjust the adjustment mechanism 35, thereby automatically adjusting the position of the second dielectric lens 9. The distance sensor 39 may be a distance sensor using electromagnetic waves or supersonic waves. However, the present invention is not to be limited to this. It is possible to apply various parts or devices which can detects a distance to the object and electrically output the physical amount based on the distance.

Furthermore, by applying the radar technique to the ground vehicle velocity sensor, the ground vehicle velocity sensor itself can have the function of the distance sensor 39 for detecting the vehicle height. In this case, from the output of the ground vehicle velocity sensor, it is possible to calculate the velocity with respect to the ground and the distance to the ground and accordingly, there is no need of arranging the external distance sensor 39.

According to the present embodiment, it is possible to correct the change of the area of the electromagnetic wave emitted to the ground due to the vehicle height. Accordingly, it is possible to detect a highly-accurate velocity not depending on the vehicle type.

It should be noted that explanation has been given on the case of the embodiment using two dielectric lenses but at least the equivalent effect can be obtained when using three or more dielectric lenses or a parabolic antenna or an array antenna in combination with the dielectric lens.

It should be noted that in the first to the sixth embodiments, explanation has been given on the velocity sensor using electromagnetic waves such as microwave and millimeterwave. However, the present invention is not to be limited to this. At least the equivalent effect can be obtained when the invention is applied to the velocity sensor using light or supersonic wave.

Moreover, explanation has been given on the case of ground vehicle velocity sensor for measuring a speed with respect to the ground. However, the present invention is not limited to this and at least equivalent effect can be obtained when the present invention is applied to various velocity sensors measuring other objects.

Moreover, the beam shape of the electromagnetic wave emitted from the velocity sensor of the present invention and the ground vehicle velocity sensor using it is not limited to those disclosed in the aforementioned embodiments 1 to 6. Various shapes can be applied if the beam width in the vicinity of the ground is smaller than the beam width in the vicinity of the sensor. In any of the beam shapes formed, the device configuration disclosed in the aforementioned embodiments are effective.

Moreover, by combining the configuration of the aforementioned embodiments, it is possible to obtain the effect as a total of the effects obtained by each of the embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A velocity sensor configured so as to be installed on a movable body and comprising:
    a sensor circuit unit for generating a transmission signal having wave characteristics, receiving a reflection signal of the transmission signal reflected from an object, and generating and outputting a signal required for calculating a relative speed between said movable body and said object according to the reflection signal received and the transmission signal, and
    a lens for modifying the irradiation angle of the transmission signal generated by the sensor circuit unit,
    wherein said sensor circuit unit generates the transmission signal to form a beam shape, which is formed with a beam width in the vicinity of said object not greater than the beam width in the vicinity of an emission opening of said velocity sensor for emitting the transmission signal,
    wherein said sensor circuit unit includes a substrate, an integrated circuit device mounted on said substrate, a transmission antenna electrically connected to said integrated circuit device and emitting said transmission signal, and a reception antenna electrically connected to said integrated circuit device and receiving said reflection signal;
    wherein said transmission signal is an electromagnetic wave and said lens is a dielectric lens configured in such a manner that the focal distance of the electromagnetic wave is modifiable;
    wherein said dielectric lens is formed by a first dielectric lens and a second dielectric lens arranged separately from said first dielectric lens; and
    further comprising an adjustment mechanism for adjusting the position of at least one of said first and said second dielectric lens in said velocity sensor.

2. A velocity sensor as claimed in claim 1, further comprising a control device for controlling said adjustment mechanism according to a signal containing information on the distance between said object and said velocity sensor.

3. A velocity sensor as claimed in claim 1, wherein at least one of said transmission antenna and said reception antenna is formed on a semiconductor substrate.

4. A velocity sensor as claimed in claim 1, wherein at least one of said transmission antenna and said reception antenna is formed together with an active circuit constituting the sensor circuit unit monolithically on the same semiconductor substrate.

5. A velocity sensor as claimed in claim 4, wherein said semiconductor substrate is mounted on a resin mold package.

6. A velocity sensor as claimed in claim 5, wherein said first dielectric lens is unitarily formed on the resin mold package.

7. A velocity sensor according to claim 1, wherein said velocity sensor is a ground vehicle velocity sensor for detecting a ground travelling speed of a vehicle as said movable body travelling on a ground and said sensor circuit unit is a beam generation unit, said traveling speed determined according to frequency of a beam emitted from the beam generation unit as said wave characteristic toward the ground as the object and frequency of a reflection beam generated from the beam reflected from the ground,
    wherein the beam generation unit generates the beam to form the beam shape such that the beam width in the vicinity of the ground is not greater than than the beam width in the vicinity of the emission opening of said beam generation unit for emitting the beam, and
    wherein the beam is emitted from the emission opening in the direction defining a predetermined angle with the relative speed direction of said vehicle with respect to said ground, the predetermined angle being an arbitrary angle greater than 0 degrees and smaller than 90 degrees or greater than 90 degrees and smaller than 180 degrees.

8. A ground vehicle velocity sensor as claimed in claim 7, wherein the distance between said ground and said second lens is greater than the distance between said first lens and said second lens.

9. A ground vehicle velocity sensor as claimed in claim 8, wherein the beam focusing unit further includes an adjustment mechanism to adjust the position of said second lens, the distance between said ground and said second lens being variable by said adjustment mechanism.

10. A velocity sensor as claimed in claim 1, wherein said sensor circuit unit generates the transmission signal to be emitted from the emission opening in a direction defining a predetermined angle with the relative speed direction of said movable body with respect to said object, the predetermined angle being an arbitrary angle greater than 0 degrees and smaller than 90 degrees or greater than 90 degrees and smaller than 180 degrees.

11. A velocity sensor as claimed in claim 10, wherein said velocity sensor forms the beam shape in such a manner that the beam width is monotonously reduced from the emission opening side toward the object side.

12. A velocity sensor as claimed in claim 11, wherein the beam shape is such that the beam width in the vicinity of said object is approximately zero.

13. A velocity sensor as claimed in claim 12, wherein said velocity sensor calculates the relative speed by using a reflection signal of a center direction component having the maximum energy level as said reflection signal.

14. A velocity sensor as claimed in claim 10, wherein said velocity sensor is configured so as to be installed on said movable body at a predetermined distance from said object, and said predetermined distance is an arbitrary distance not greater than the maximum detection distance based on the detection sensitivity of said velocity sensor.

15. A velocity sensor as claimed in claim 14, wherein said object is a ground where said movable body travels.

16. A velocity sensor as claimed in claim 15, wherein said movable body is a vehicle having wheels for travelling along said ground and a vehicle body for fixing the axles of the wheels, and said velocity sensor is configured so as to be installed at an arbitrary position of said vehicle body.

17. A velocity sensor as claimed in claim 16, wherein said velocity sensor is mounted on said vehicle body in such a manner that a distance from said emission opening from which said transmission signal is emitted to said ground is a predetermined distance based on the detection sensitivity of said velocity sensor not depending on the distance from the ground to the position in the vehicle body.

18. A velocity sensor as claimed in claim 10, wherein said movable body is configured so that said velocity sensor is able to be mounted at a predetermined distance from said object, and said predetermined distance is an arbitrary distance smaller than the maximum detection distance based on the detection sensitivity of said velocity sensor.

19. A velocity sensor as claimed in claim 18, wherein said object is a ground where said movable body travels.

20. A velocity sensor as claimed in claim 19, wherein said movable body is a vehicle having wheels for travelling along said ground and a vehicle body for fixing the axles of the wheels, and said velocity sensor is configured so as to be installed at an arbitrary position of said vehicle body.

21. A velocity sensor as claimed in claim 10, wherein a signal required for calculating the relative speed between said movable body and said object is a low-frequency signal having a frequency of a frequency shift amount between said transmission signal and said reflection signal caused by the Doppler effect.

22. A velocity sensor as claimed in claim 21, wherein said low-frequency signal is outputted as an analog signal to an A/D converter installed outside said velocity sensor.

23. A velocity sensor as claimed in claim 21, wherein said low-frequency signal is converted into a digital signal by an A/D converter arranged in the case of said velocity sensor before being outputted from said velocity sensor.

24. A velocity sensor as claimed in claim 1, wherein said transmission signal is an electromagnetic wave and said lens is a dielectric lens configured in such a manner that the focal distance of the electromagnetic wave is modifiable.

25. A velocity sensor as claimed in claim 24, wherein said electromagnetic wave is an electromagnetic wave of the microwave band to the millimeterwave band.

26. A velocity sensor as claimed in claim 1, wherein at least one of said transmission antenna and said reception antenna has a side wall of parabolic shape.

27. A velocity sensor configured so as to be installed on a movable body and comprising;

a sensor circuit unit for generating a transmission signal having wave characteristics, receiving a reflection signal of the transmission signal reflected from an object, and generating and outputting a signal required for calculating a relative speed between said movable body and said object according to the reflection signal received and the transmission signal, and a lens for modifying the irradiation angle of the transmission signal generated by the sensor circuit unit.

wherein said sensor circuit unit generates the transmission signal to form a beam shape, which is formed with a beam width in the vicinity of said object not greater than the beam width in the vicinity of an emission opening of said velocity sensor for emitting the transmission signal;

wherein said sensor circuit unit includes a substrate, an integrated circuit device mounted on said substrate, a transmission antenna electrically connected to said integrated circuit device and emitting said transmission signal, and a reception antenna electrically connected to said integrated circuit device and receiving said reflection signal;

wherein said transmission signal is an electromagnetic wave and said lens is a dielectric lens configured in such a manner that the focal distance of the electromagnetic wave is modifiable;

wherein said dielectric lens is formed by a first dielectric lens and a second dielectric lens arranged separately from said first dielectric lens; and wherein said transmission antenna and said reception antenna are formed as a planar antenna on said substrate and said substrate is sealed by a metal package.

28. A velocity sensor as claimed in claim 27, wherein said metal package has a window through which an electromagnetic wave is able to pass and said first dielectric lens is arranged at said window.

* * * * *